US009159236B2

(12) United States Patent
Lord et al.

(10) Patent No.: US 9,159,236 B2
(45) Date of Patent: Oct. 13, 2015

(54) PRESENTATION OF SHARED THREAT INFORMATION IN A TRANSPORTATION-RELATED CONTEXT

(75) Inventors: Richard T. Lord, Tacoma, WA (US); Robert W. Lord, Seattle, WA (US); Nathan P. Myhrvold, Medina, WA (US); Clarence T. Tegreene, Bellevue, WA (US); Roderick A. Hyde, Redmond, WA (US); Lowell L. Wood, Jr., Bellevue, WA (US); Muriel Y. Ishikawa, Livermore, CA (US); Victoria Y. H. Wood, Livermore, CA (US); Charles Whitmer, North Bend, WA (US); Paramvir Bahl, Bellevue, WA (US); Douglas C. Burger, Bellevue, WA (US); Ranveer Chandra, Kirkland, WA (US); William H. Gates, III, Medina, WA (US); Paul Holman, Seattle, WA (US); Jordin T. Kare, Seattle, WA (US); Craig J. Mundie, Seattle, WA (US); Tim Paek, Sammamish, WA (US); Desney S. Tan, Kirkland, WA (US); Lin Zhong, Houston, TX (US); Matthew G. Dyor, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 543 days.

(21) Appl. No.: 13/434,475

(22) Filed: Mar. 29, 2012

(65) Prior Publication Data
US 2013/0144490 A1    Jun. 6, 2013

Related U.S. Application Data

(63) Continuation-in-part of application No. 13/309,248, filed on Dec. 1, 2011, now Pat. No. 8,811,638, and a continuation-in-part of application No. 13/324,232, filed on Dec. 13, 2011, now Pat. No. 8,934,652, and a
(Continued)

(51) Int. Cl.
*G08G 1/16*     (2006.01)
*B60T 17/22*    (2006.01)

(52) U.S. Cl.
CPC ............... *G08G 1/164* (2013.01); *B60T 17/22* (2013.01); *B60T 2201/022* (2013.01); *B60T 2210/36* (2013.01)

(58) Field of Classification Search
USPC .......... 701/1, 41, 48, 51, 53, 65, 70, 99, 301, 701/412, 414
See application file for complete search history.

(56) References Cited

U.S. PATENT DOCUMENTS

| 5,239,586 A | 8/1993 | Marui |
| 5,515,026 A | 5/1996 | Ewert |

(Continued)

OTHER PUBLICATIONS

Menon, Arvind et al; "Roadside Range Sensors for Intersection Decision Support"; bearing a date of Apr. 1, 2004; IEEE; pp. 1-6.

*Primary Examiner* — Kim T Nguyen
(74) *Attorney, Agent, or Firm* — Benedict R. Dugan; Ellen M. Bierman; Lowe Graham Jones PLLC

(57) ABSTRACT

Techniques for ability enhancement are described. In some embodiments, devices and systems located in a transportation network share threat information with one another, in order to enhance a user's ability to operate or function in a transportation-related context. In one embodiment, a process in a vehicle receives threat information from a remote device, the threat information based on information about objects or conditions proximate to the remote device. The process then determines that the threat information is relevant to the safe operation of the vehicle. Then, the process modifies operation of the vehicle based on the threat information, such as by presenting a message to the operator of the vehicle and/or controlling the vehicle itself.

47 Claims, 33 Drawing Sheets

Related U.S. Application Data continuation-in-part of application No. 13/340,143, filed on Dec. 29, 2011, now Pat. No. 9,053,096, and a continuation-in-part of application No. 13/356,419, filed on Jan. 23, 2012, and a continuation-in-part of application No. 13/362,823, filed on Jan. 31, 2012, and a continuation-in-part of application No. 13/397,289, filed on Feb. 15, 2012, and a continuation-in-part of application No. 13/407,570, filed on Feb. 28, 2012, now Pat. No. 9,064,152, and a continuation-in-part of application No. 13/425,210, filed on Mar. 20, 2012.

(56) References Cited

U.S. PATENT DOCUMENTS

| | | | |
|---|---|---|---|
| 5,983,161 A | 11/1999 | Lemelson et al. | |
| 5,995,898 A * | 11/1999 | Tuttle | 701/102 |
| 6,226,389 B1 | 5/2001 | Lemelson et al. | |
| 6,304,648 B1 | 10/2001 | Chang | |
| 6,326,903 B1 | 12/2001 | Gross et al. | |
| 6,529,866 B1 | 3/2003 | Cope et al. | |
| 6,628,767 B1 | 9/2003 | Wellner et al. | |
| 6,731,202 B1 * | 5/2004 | Klaus | 340/425.5 |
| 6,944,474 B2 | 9/2005 | Rader et al. | |
| 7,224,981 B2 | 5/2007 | Deisher et al. | |
| 7,324,015 B1 | 1/2008 | Allen et al. | |
| 7,606,444 B1 | 10/2009 | Erol et al. | |
| 7,783,022 B1 | 8/2010 | Jay et al. | |
| 8,050,917 B2 | 11/2011 | Caspi et al. | |
| 8,352,245 B1 | 1/2013 | Lloyd | |
| 8,369,184 B2 | 2/2013 | Calhoun | |
| 8,618,952 B2 | 12/2013 | Mochizuki | |
| 8,669,854 B2 | 3/2014 | D'Ambrosio et al. | |
| 2002/0021799 A1 | 2/2002 | Kaufholz | |
| 2002/0196134 A1 | 12/2002 | Lutter et al. | |
| 2003/0009277 A1 | 1/2003 | Fan et al. | |
| 2003/0139881 A1 * | 7/2003 | Miller et al. | 701/301 |
| 2003/0158900 A1 | 8/2003 | Santos | |
| 2004/0064322 A1 | 4/2004 | Georgiopoulos et al. | |
| 2004/0100868 A1 | 5/2004 | Patterson, Jr. et al. | |
| 2004/0122678 A1 | 6/2004 | Rousseau | |
| 2004/0172252 A1 | 9/2004 | Aoki et al. | |
| 2004/0230651 A1 | 11/2004 | Ivashin | |
| 2004/0263610 A1 | 12/2004 | Whynot et al. | |
| 2005/0018828 A1 | 1/2005 | Nierhaus et al. | |
| 2005/0038648 A1 | 2/2005 | Ju et al. | |
| 2005/0041529 A1 | 2/2005 | Schliep et al. | |
| 2005/0088981 A1 | 4/2005 | Woodruff et al. | |
| 2005/0135583 A1 | 6/2005 | Kardos | |
| 2005/0207554 A1 | 9/2005 | Ortel | |
| 2005/0222769 A1 | 10/2005 | Simon | |
| 2006/0080004 A1 | 4/2006 | Cheok et al. | |
| 2006/0195850 A1 | 8/2006 | Knight et al. | |
| 2007/0118498 A1 | 5/2007 | Song et al. | |
| 2008/0061958 A1 | 3/2008 | Birk et al. | |
| 2008/0117838 A1 | 5/2008 | Yee et al. | |
| 2008/0195387 A1 | 8/2008 | Zigel et al. | |
| 2008/0270132 A1 | 10/2008 | Navratil et al. | |
| 2008/0300777 A1 | 12/2008 | Fehr et al. | |
| 2009/0040037 A1 | 2/2009 | Schraga | |
| 2009/0070102 A1 | 3/2009 | Maegawa | |
| 2009/0119324 A1 | 5/2009 | Simard et al. | |
| 2009/0198735 A1 | 8/2009 | Yu et al. | |
| 2009/0204620 A1 | 8/2009 | Thione et al. | |
| 2009/0271176 A1 | 10/2009 | Bodin et al. | |
| 2009/0281789 A1 | 11/2009 | Waibel et al. | |
| 2009/0282103 A1 | 11/2009 | Thakkar et al. | |
| 2009/0306957 A1 | 12/2009 | Gao et al. | |
| 2009/0307616 A1 | 12/2009 | Nielsen | |
| 2010/0040217 A1 | 2/2010 | Aberg et al. | |
| 2010/0135478 A1 | 6/2010 | Wald et al. | |
| 2010/0153497 A1 | 6/2010 | Sylvain et al. | |
| 2010/0185434 A1 | 7/2010 | Burvall et al. | |
| 2010/0222098 A1 | 9/2010 | Garg | |
| 2010/0315218 A1 | 12/2010 | Cades et al. | |
| 2011/0010041 A1 | 1/2011 | Wagner et al. | |
| 2011/0153324 A1 | 6/2011 | Ballinger et al. | |
| 2011/0184721 A1 | 7/2011 | Subramanian et al. | |
| 2011/0196580 A1 * | 8/2011 | Xu et al. | 701/48 |
| 2011/0237295 A1 | 9/2011 | Bartkowiak et al. | |
| 2011/0270922 A1 | 11/2011 | Jones et al. | |
| 2011/0307241 A1 | 12/2011 | Waibel et al. | |
| 2012/0010886 A1 | 1/2012 | Razavilar | |
| 2012/0025965 A1 | 2/2012 | Mochizuki et al. | |
| 2012/0046833 A1 | 2/2012 | Sanma et al. | |
| 2012/0069131 A1 | 3/2012 | Abelow | |
| 2012/0072109 A1 | 3/2012 | Waite et al. | |
| 2012/0075407 A1 | 3/2012 | Wessling | |
| 2012/0197629 A1 | 8/2012 | Nakamura et al. | |
| 2012/0323575 A1 | 12/2012 | Gibbon et al. | |
| 2013/0021950 A1 | 1/2013 | Chen et al. | |
| 2013/0022189 A1 | 1/2013 | Ganong, III et al. | |
| 2013/0057691 A1 | 3/2013 | Atsmon et al. | |
| 2013/0058471 A1 | 3/2013 | Garcia | |
| 2013/0063542 A1 | 3/2013 | Bhat et al. | |
| 2013/0103399 A1 | 4/2013 | Gammon | |
| 2013/0204616 A1 | 8/2013 | Aoki et al. | |
| 2014/0055242 A1 | 2/2014 | Mendonca et al. | |

* cited by examiner

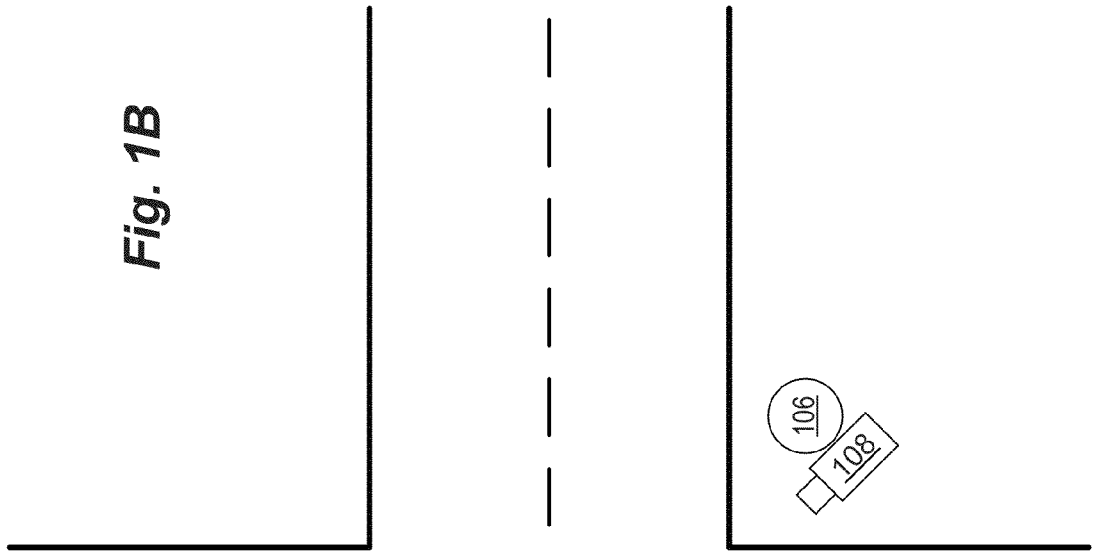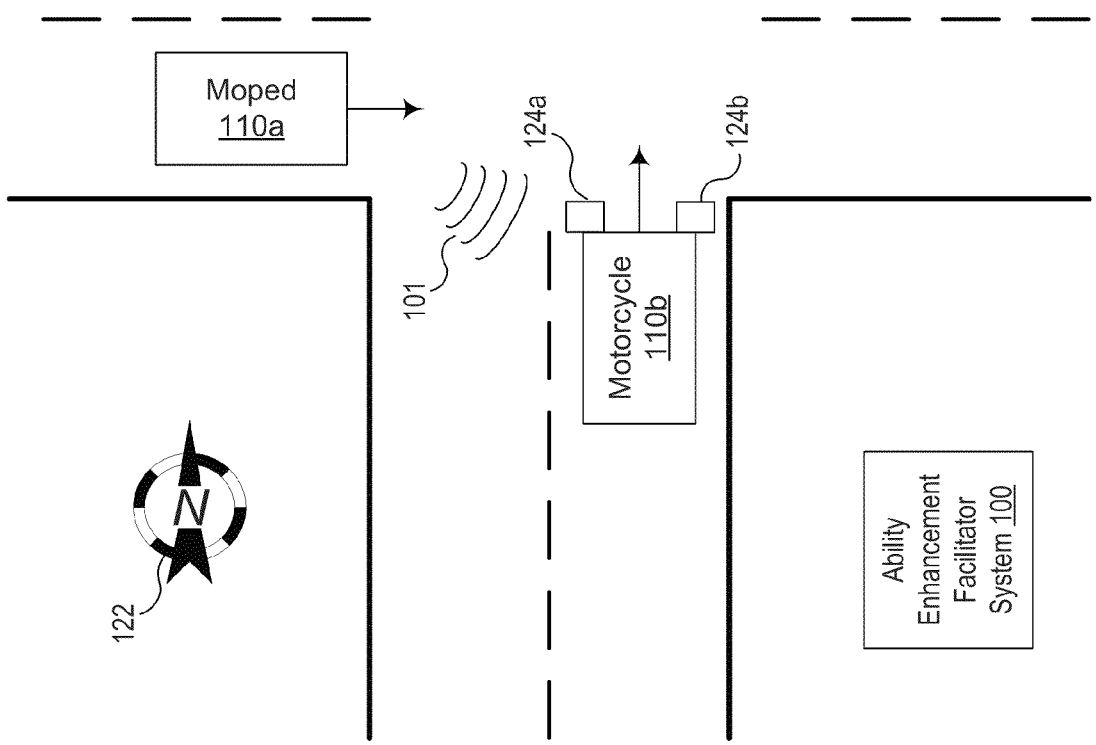

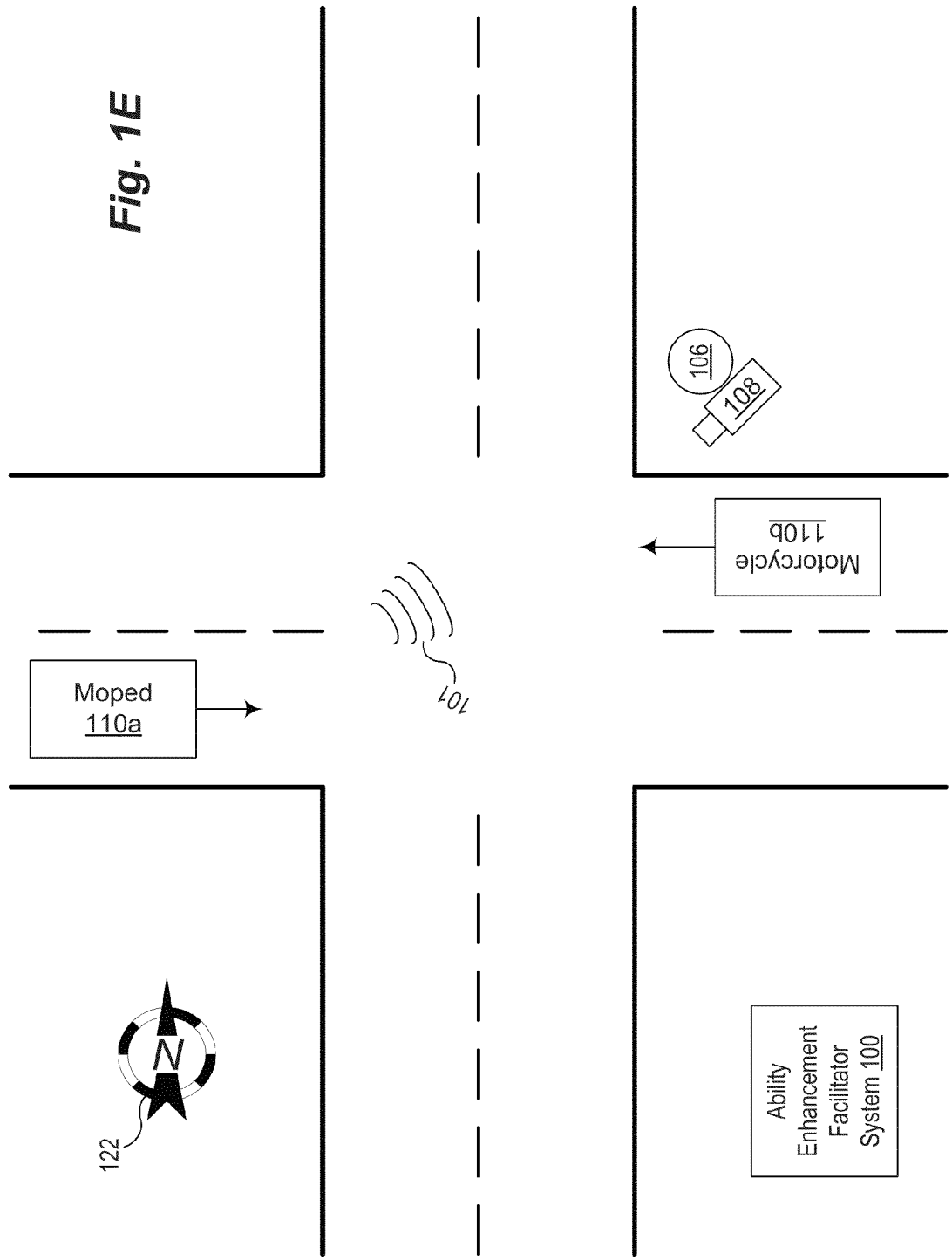

Fig. 3.1

3.100: A process for enhancing ability in a transportation-related context 3.103: at a first vehicle, receiving threat information from a remote device, the threat information based at least in part on information about objects and/or conditions proximate to the remote device

3.106: determining that the threat information is relevant to safe operation of the first vehicle

3.109: modifying operation of the first vehicle based on the threat information

Fig. 3.2

3.200: The process of 3.100, wherein the receiving threat information includes:

3.202: receiving threat information determined based on information about driving conditions proximate to the remote device

Fig. 3.3

3.300: The process of 3.200, wherein the information about driving conditions indicates that icy surface conditions are present proximate to the remote device

*Fig. 3.4*

3.400: The process of 3.200, wherein the information about driving conditions indicates that wet surface conditions are present proximate to the remote device

*Fig. 3.5*

3.500: The process of 3.200, wherein the information about driving conditions indicates that oily surface conditions are present proximate to the remote device

*Fig. 3.6*

3.600: The process of 3.200, wherein the information about driving conditions indicates that a limited visibility condition is present proximate to the remote device

*Fig. 3.7*

3.700: The process of 3.200, wherein the information about driving conditions indicates that there is an accident proximate to the remote device

*Fig. 3.8*

3.800: The process of 3.100, wherein the receiving threat information includes:

> 3.802: receiving threat information determined based on information about a second vehicle proximate to the remote device

Fig. 3.9

3.900: The process of 3.800, wherein the information about a second vehicle indicates that the second vehicle is driving erratically

Fig. 3.10

3.1000: The process of 3.800, wherein the information about a second vehicle indicates that the second vehicle is driving with excessive speed

Fig. 3.11

3.1100: The process of 3.800, wherein the information about a second vehicle indicates that the second vehicle is driving too slowly

Fig. 3.12

3.1200: The process of 3.100, wherein the receiving threat information includes:

> 3.1202: receiving threat information determined based on information about a pedestrian proximate to the remote device

Fig. 3.13

3.1300: The process of 3.1200, wherein the information about a pedestrian indicates that a pedestrian is present in a roadway proximate to the remote device

Fig. 3.14

3.1400: The process of 3.100, wherein the receiving threat information includes:

> 3.1402: receiving threat information determined based on information about an object in a roadway proximate to the remote device

Fig. 3.15

3.1500: The process of 3.100, wherein the receiving threat information includes:

> 3.1502: receiving threat information determined at a second vehicle with respect to information about objects and/or conditions received at the second vehicle

Fig. 3.16

3.1600: The process of 3.1500, wherein the receiving threat information determined at a second vehicle includes:

> 3.1602: receiving threat information determined by a wearable device of an occupant of the second vehicle

Fig. 3.17

3.1700: The process of 3.1500, wherein the receiving threat information determined at a second vehicle includes:

> 3.1702: receiving threat information determined by a computing device installed in the second vehicle

Fig. 3.18

3.1800: The process of 3.1500, wherein the receiving threat information determined at a second vehicle includes:

> 3.1802: receiving motion-related information from a sensor attached to the second vehicle

Fig. 3.19

3.1900: The process of 3.1800, wherein the receiving motion-related information includes:

> 3.1902: receiving position information from a position sensor of the second vehicle

Fig. 3.20

3.2000: The process of 3.1800, wherein the receiving motion-related information includes:

> 3.2002: receiving velocity information from a velocity sensor of the second vehicle

Fig. 3.21

3.2100: The process of 3.100, wherein the receiving threat information includes:

> 3.2102: receiving threat information determined by a road-based device with respect to information about objects and/or conditions received at the road-based device

Fig. 3.22

3.2200: The process of 3.2100, wherein the receiving threat information determined by a road-based device includes:

> 3.2202: receiving threat information determined by a road-based computing device configured to receive the information about objects and/or conditions from vehicles proximate to the road-based computing device

Fig. 3.23

3.2300: The process of 3.2100, wherein the receiving threat information determined by a road-based device includes:

> 3.2302: receiving threat information determined by a road-based computing device configured to receive the information about objects and/or conditions from road-based sensors

Fig. 3.24

3.2400: The process of 3.2100, wherein the road-based device is a sensor attached to a structure proximate to the first vehicle

Fig. 3.25

3.2500: The process of 3.2400, wherein the structure proximate to the first vehicle is one of a utility pole, a traffic control signal support, a building, a street light, a tunnel wall, a bridge, an overpass, a flyover, a communication tower, a traffic kiosk, an advertisement structure, a roadside sign, an information/regulatory display, and/or a vehicle toll reader

Fig. 3.26

3.2600: The process of 3.2400, wherein the receiving threat information determined by a road-based device includes:

> 3.2602: receiving an image of a second vehicle from a camera deployed at an intersection

Fig. 3.27

3.2700: The process of 3.2400, wherein the receiving threat information determined by a road-based device includes:

> 3.2702: receiving ranging data from a range sensor deployed at an intersection, the ranging data representing a distance between a second vehicle and the intersection

Fig. 3.28

3.2800: The process of 3.2400, wherein the road-based device includes a camera

*Fig. 3.29*

3.2900: The process of 3.2400, wherein the road-based device includes a microphone

*Fig. 3.30*

3.3000: The process of 3.2400, wherein the road-based device includes a radar gun

*Fig. 3.31*

3.3100: The process of 3.2400, wherein the road-based device includes a range sensor

*Fig. 3.32*

3.3200: The process of 3.2400, wherein the road-based device includes a receiver operable to receive motion-related information transmitted from a second vehicle, the motion-related information including at least one of a position of the second vehicle, a velocity of the second vehicle, and/or a trajectory of the second vehicle

*Fig. 3.33*

3.3300: The process of 3.2100, wherein the road-based device is embedded in a roadway

Fig. 3.34

3.3400: The process of 3.3300, wherein the road-based device includes an induction loop embedded in the roadway, the induction loop configured to detect the presence and/or velocity of a second vehicle

Fig. 3.35

3.3500: The process of 3.3400, wherein the receiving threat information determined by a road-based device includes:

> 3.3502: receiving motion-related information from the induction loop, the motion-related information including at least one of a position of the second vehicle, a velocity of the second vehicle, and/or a trajectory of the second vehicle

Fig. 3.36

3.3600: The process of 3.100, wherein the determining that the threat information is relevant to safe operation of the first vehicle includes:

> 3.3602: determining a location associated with the remote device

> 3.3605: determining whether the first vehicle is approaching the location

Fig. 3.37

3.3700: The process of 3.3600, wherein the location associated with the remote device includes the location of a road-based device

Fig. 3.38

3.3800: The process of 3.3600, wherein the location associated with the remote device includes a location of a second vehicle that includes the remote device

Fig. 3.39

3.3900: The process of 3.3600, wherein the determining whether the first vehicle is approaching the location includes:

> 3.3902: determining whether the first vehicle is within a threshold distance from the location associated with the remote device

Fig. 3.40

3.4000: The process of 3.3600, wherein the determining whether the first vehicle is approaching the location includes:

> 3.4002: determining whether the first vehicle is moving on trajectory that intersects the location associated with the remote device

Fig. 3.41

3.4100: The process of 3.100, wherein the determining that the threat information is relevant to safe operation of the first vehicle includes:

3.4102: determining a threat to the first vehicle based on the threat information

3.4105: determining a likelihood associated with the threat

3.4108: determining that the likelihood is greater than a threshold level

Fig. 3.42

3.4200: The process of 3.4100, wherein the determining a threat to the first vehicle based on the threat information includes:

3.4202: predicting a path of an object identified by the threat information

3.4204: predicting a path of the first vehicle

3.4206: determining, based on the paths of the object and the first vehicle, whether the first vehicle and the object will come within a threshold distance of one another

Fig. 3.43

3.4300: The process of 3.4100, wherein the determining a likelihood associated with the threat includes:

> 3.4302: determining a likelihood that the first vehicle will collide with a second vehicle identified by the threat information

Fig. 3.44

3.4400: The process of 3.4100, wherein the determining a likelihood associated with the threat includes:

> 3.4402: determining a likelihood that the first vehicle will collide with a pedestrian identified by the threat information

Fig. 3.45

3.4500: The process of 3.4100, wherein the determining a likelihood associated with the threat includes:

> 3.4502: determining a likelihood that the first vehicle will collide with an animal identified by the threat information

Fig. 3.46

3.4600: The process of 3.4100, wherein the determining a likelihood associated with the threat includes:

> 3.4602: determining a likelihood that surface conditions identified by the threat information will cause an operator to lose control of the first vehicle

Fig. 3.47

3.4700: The process of 3.100, wherein the determining that the threat information is relevant to safe operation of the first vehicle includes:

> 3.4702: determining that the threat information is relevant based on gaze information associated with an operator of the first vehicle

Fig. 3.48

3.4800: The process of 3.4700, further comprising:

> 3.4802: determining that the operator has not looked at the road for more than a threshold amount of time

Fig. 3.49

3.4900: The process of 3.4700, further comprising:

> 3.4902: receiving an indication of a direction in which the operator is looking

> 3.4904: determining that the operator is not looking towards an approaching second vehicle

> 3.4906: in response to determining that the operator is not looking towards the second vehicle, directing the operator to look towards the second vehicle

Fig. 3.50

3.5000: The process of 3.100, wherein the modifying operation of the first vehicle includes:

> 3.5002: presenting a message based on the threat information to an operator of the first vehicle

Fig. 3.51

3.5100: The process of 3.5000, wherein the presenting a message based on the threat information to an operator of the first vehicle includes:

> 3.5102: presenting a warning to the operator

Fig. 3.52

3.5200: The process of 3.5000, wherein the presenting a message based on the threat information to an operator of the first vehicle includes:

> 3.5202: presenting an instruction to the operator

Fig. 3.53

3.5300: The process of 3.5000, wherein the presenting a message based on the threat information to an operator of the first vehicle includes:

> 3.5302: directing the operator to accelerate or decelerate

Fig. 3.54

3.5400: The process of 3.5000, wherein the presenting a message based on the threat information to an operator of the first vehicle includes:

> 3.5402: directing the operator to turn or not to turn

Fig. 3.55

3.5500: The process of 3.5000, wherein the presenting a message based on the threat information to an operator of the first vehicle includes:

> 3.5502: presenting the message via an audio output device

Fig. 3.56

3.5600: The process of 3.5500, wherein the audio output device is a speaker of a wearable device of the operator

Fig. 3.57

3.5700: The process of 3.5500, wherein the audio output device is a speaker of an audio system of the first vehicle

Fig. 3.58

3.5800: The process of 3.5500, wherein the audio output device is a speaker of a mobile computing device present within the first vehicle

Fig. 3.59

3.5900: The process of 3.5000, wherein the presenting a message based on the threat information to an operator of the first vehicle includes:

> 3.5902: presenting the message via a visual display device

Fig. 3.60

3.6000: The process of 3.5900, wherein the visual display device is a display of a wearable device of the operator

Fig. 3.61

3.6100: The process of 3.5900, wherein the visual display device is a display of the first vehicle

Fig. 3.62

3.6200: The process of 3.5900, wherein the presenting a message based on the threat information to an operator of the first vehicle includes:

> 3.6202: displaying an indicator that instructs the operator to look towards an oncoming vehicle identified by the threat information

Fig. 3.63

3.6300: The process of 3.5900, wherein the presenting a message based on the threat information to an operator of the first vehicle includes:

> 3.6302: displaying an indicator that instructs the operator to accelerate, decelerate, and/or turn

Fig. 3.64

3.6400: The process of 3.5000, wherein the presenting a message based on the threat information to an operator of the first vehicle includes:

> 3.6402: providing tactile feedback to the user

Fig. 3.65

3.6500: The process of 3.6400, wherein the providing tactile feedback to the user includes:

> 3.6502: causing a steering device, seat, and/or pedal of the first vehicle to vibrate

Fig. 3.66

3.6600: The process of 3.100, wherein the modifying operation of the first vehicle includes:

> 3.6602: controlling the first vehicle

Fig. 3.67

3.6700: The process of 3.6600, wherein the controlling the first vehicle includes:

> 3.6702: decreasing speed of the first vehicle by applying brakes of the first vehicle and/or by reducing output of an engine of the first vehicle

Fig. 3.68

3.6800: The process of 3.6600, wherein the controlling the first vehicle includes:

> 3.6802: increasing speed of the first vehicle by releasing brakes of the first vehicle and/or by increasing output of an engine of the first vehicle

Fig. 3.69

3.6900: The process of 3.6600, wherein the controlling the first vehicle includes:

> 3.6902: changing direction of the first vehicle

Fig. 3.70

3.7000: The process of 3.100, wherein the receiving threat information includes:

> 3.7002: receiving threat information determined based on image data

*Fig. 3.71*

3.7100: The process of 3.7000, wherein the receiving threat information determined based on image data includes:

> 3.7102: receiving threat information determined based on image data received from a camera that is attached to at least one of: a road-side structure, a wearable device of a pedestrian, or a second vehicle

*Fig. 3.72*

3.7200: The process of 3.7000, wherein the receiving threat information determined based on image data includes:

> 3.7202: receiving threat information determined based on image data that includes multiple images of a second vehicle taken at different times

*Fig. 3.73*

3.7300: The process of 3.7000, wherein the receiving threat information determined based on image data includes:

> 3.7302: receiving threat information that includes motion-related information about a second vehicle based on one or more images of the second vehicle, the motion-related information including at least one of a position, velocity, acceleration, and/or mass of the second vehicle

Fig. 3.74

3.7400: The process of 3.7000, wherein the receiving threat information determined based on image data includes:

> 3.7402: receiving threat information that identifies objects other than vehicles in the image data

Fig. 3.75

3.7500: The process of 3.7000, wherein the receiving threat information determined based on image data includes:

> 3.7502: receiving threat information that includes driving conditions information based on the image data

Fig. 3.76

3.7600: The process of 3.100, wherein the receiving threat information includes:

> 3.7602: receiving threat information determined based on audio data representing an audio signal emitted or reflected by an object

Fig. 3.77

3.7700: The process of 3.7600, wherein the receiving threat information determined based on audio data includes:

> 3.7702: receiving threat information determined based on audio data obtained at a microphone array that includes multiple microphones

Fig. 3.78

3.7800: The process of 3.7700, wherein the receiving threat information determined based on audio data obtained at a microphone array includes:

> 3.7802: receiving threat information determined based on audio data obtained at a microphone array, the microphone array coupled to a road-side structure

Fig. 3.79

3.7900: The process of 3.7600, wherein the receiving threat information determined based on audio data includes:

> 3.7902: receiving threat information determined based on acoustic source localization performed to determine a position of the object based on multiple audio signals received via multiple microphones

Fig. 3.80

3.8000: The process of 3.100, further comprising:

> 3.8002: identifying multiple threats to the first vehicle, at least one of which is based on the threat information

> 3.8004: identifying a first one of the multiple threats that is more significant than at least one other of the multiple threats

> 3.8007: instructing an operator of the first vehicle to avoid the first one of the multiple threats

Fig. 3.81

3.8100: The process of 3.8000, wherein the identifying a first one of the multiple threats that is more significant than at least one other of the multiple threats includes:

> 3.8102: selecting the most significant threat from the multiple threats

Fig. 3.82

3.8200: The process of 3.8000, further comprising:

> 3.8202: modeling multiple potential accidents that each correspond to one of the multiple threats to determine a collision force associated with each accident

> 3.8204: selecting the first threat based at least in part on which of the multiple accidents has the highest collision force

Fig. 3.83

3.8300: The process of 3.8000, further comprising:

> 3.8302: determining a likelihood of an accident associated with each of the multiple threats

> 3.8304: selecting the first threat based at least in part on which of the multiple threats has the highest associated likelihood

*Fig. 3.84*

3.8400: The process of 3.8000, further comprising:

3.8402: determining a mass of an object associated with each of the multiple threats

3.8404: selecting the first threat based at least in part on which of the objects has the highest mass, without reference to velocity or acceleration of the object

*Fig. 3.85*

3.8500: The process of 3.100, further comprising:

3.8502: determining that an evasive action with respect to the threat information poses a threat to some other object

3.8504: instructing an operator of the first vehicle to take some other evasive action that poses a lesser threat to the some other object

*Fig. 3.86*

3.8600: The process of 3.100, further comprising:

3.8602: identifying multiple threats that each have an associated likelihood and cost, at least one of which is based on the threat information

3.8606: determining a course of action that minimizes an expected cost with respect to the multiple threats

Fig. 3.87

3.8700: The process of 3.8600, wherein the cost is based on one or more of a cost of damage to a vehicle, a cost of injury or death of a human, a cost of injury or death of an animal, a cost of damage to a structure, a cost of contents or fixtures within a structure, a cost of emotional distress, and/or cost to a business or person based on negative publicity associated with an accident

Fig. 3.88

3.8800: The process of 3.8600, wherein the identifying multiple threats includes:

> 3.8802: identifying multiple threats that are each related to different persons or things

Fig. 3.89

3.8900: The process of 3.8600, wherein the identifying multiple threats includes:

> 3.8902: identifying multiple threats that are each related to the first vehicle and/or an operator thereof

Fig. 3.90

3.9000: The process of 3.8600, wherein the determining a course of action that minimizes an expected cost includes:

> 3.9002: minimizing expected costs to the operator of the first vehicle posed by the multiple threats

Fig. 3.91

3.9100: The process of 3.8600, wherein the determining a course of action that minimizes an expected cost includes:

> 3.9102: minimizing overall expected costs posed by the multiple threats, the overall expected costs being a sum of expected costs borne by an operator of the first vehicle and other persons/things

Fig. 3.92

3.9200: The process of 3.100, further comprising:

> 3.9202: performing the receiving threat information, the determining that the threat information is relevant to safe operation of the first vehicle, and/or the modifying operation of the first vehicle at a computing system of the first vehicle

Fig. 3.93

3.9300: The process of 3.100, further comprising:

> 3.9302: performing the determining that the threat information is relevant to safe operation of the first vehicle and/or the modifying operation of the first vehicle at a computing system remote from the first vehicle

PRESENTATION OF SHARED THREAT INFORMATION IN A TRANSPORTATION-RELATED CONTEXT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/309,248, entitled AUDIBLE ASSISTANCE, filed 1 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/324,232, entitled VISUAL PRESENTATION OF SPEAKER-RELATED INFORMATION, filed 13 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/340,143, entitled LANGUAGE TRANSLATION BASED ON SPEAKER-RELATED INFORMATION, filed 29 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/356,419, entitled ENHANCED VOICE CONFERENCING, filed 23 Jan. 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/362,823, entitled VEHICULAR THREAT DETECTION BASED ON AUDIO SIGNALS, filed 31 Jan. 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/397,289, entitled ENHANCED VOICE CONFERENCING WITH HISTORY, filed 15 Feb. 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/407,570, entitled VEHICULAR THREAT DETECTION BASED ON IMAGE ANALYSIS, filed 28 Feb. 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/425,210, entitled DETERMINING THREATS BASED ON INFORMATION FROM ROAD-BASED DEVICES IN A TRANSPORTATION-RELATED CONTEXT, filed 20 Mar. 2012, which is currently co-pending, or is an application of which a currently co-pending application is entitled to the benefit of the filing date.

TECHNICAL FIELD

The present disclosure relates to methods, techniques, and systems for ability enhancement and, more particularly, to methods, techniques, and systems for ability enhancement in a transportation-related context by sharing threat information between devices and/or vehicles present on a roadway.

BACKGROUND

Human abilities such as hearing, vision, memory, foreign or native language comprehension, and the like may be limited for various reasons. For example, as people age, various abilities such as hearing, vision, or memory, may decline or otherwise become compromised. In some countries, as the population in general ages, such declines may become more common and widespread. In addition, young people are increasingly listening to music through headphones, which may also result in hearing loss at earlier ages.

In addition, limits on human abilities may be exposed by factors other than aging, injury, or overuse. As one example, the world population is faced with an ever increasing amount of information to review, remember, and/or integrate. Managing increasing amounts of information becomes increasingly difficult in the face of limited or declining abilities such as hearing, vision, and memory.

These problems may be further exacerbated and even result in serious health risks in a transportation-related context, as distracted and/or ability impaired drivers are more prone to be involved in accidents. For example, many drivers are increasingly distracted from the task of driving by an onslaught of information from cellular phones, smart phones, media players, navigation systems, and the like. In addition, an aging population in some regions may yield an increasing number or share of drivers who are vision and/or hearing impaired.

Current approaches to addressing limits on human abilities may suffer from various drawbacks. For example, there may be a social stigma connected with wearing hearing aids, corrective lenses, or similar devices. In addition, hearing aids typically perform only limited functions, such as amplifying or modulating sounds for a hearer. Furthermore, legal regimes that attempt to prohibit the use of telephones or media devices while driving may not be effective due to enforcement difficulties, declining law enforcement budgets, and the like. Nor do such regimes address a great number of other sources of distraction or impairment, such as other passengers, car radios, blinding sunlight, darkness, or the like.

BRIEF DESCRIPTION OF THE DRAWINGS

FIGS. 1A and 1B are various views of a first example ability enhancement scenario according to an example embodiment.

FIG. 1E is a second example ability enhancement scenario according to an example embodiment.

FIGS. 3.1-3.93 are example flow diagrams of ability enhancement processes performed by example embodiments.

DETAILED DESCRIPTION

Figure 1A:
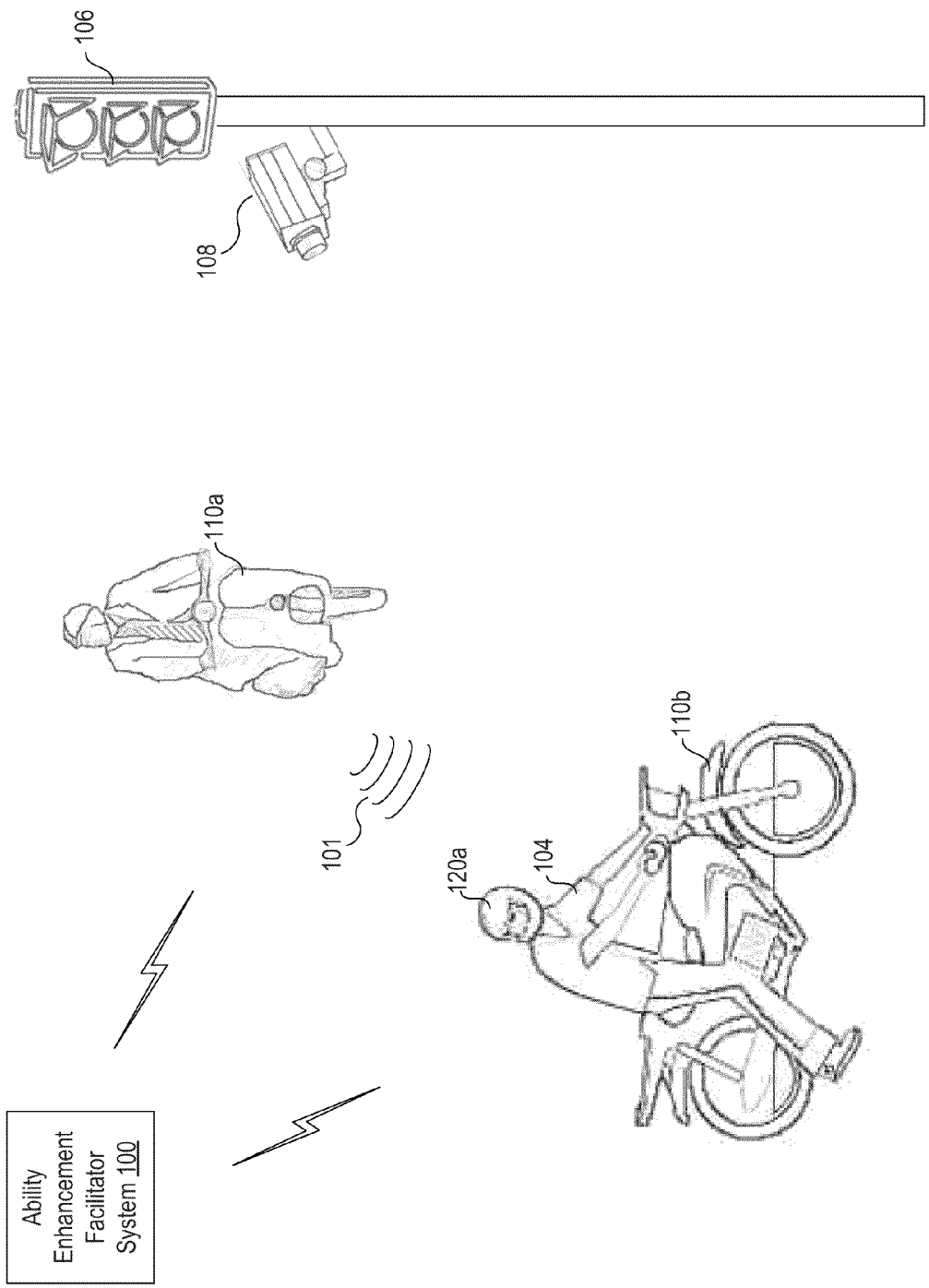

Embodiments described herein provide enhanced computer- and network-based methods and systems for ability enhancement and, more particularly, for enhancing a user's ability to operate or function in a transportation-related context (e.g., as a pedestrian or vehicle operator) by performing threat detection based at least in part on analyzing information received from road-based devices, such as a camera, microphone, or other sensor deployed at the side of a road, at an intersection, or other road-based location. The received information may include image data, audio data, or other data/signals that represent vehicles and other objects or conditions present in a roadway or other context. Example embodiments provide an Ability Enhancement Facilitator System ("AEFS") that performs at least some of the described techniques. Embodiments of the AEFS may augment, enhance, or improve the senses (e.g., hearing), faculties (e.g., memory, language comprehension), and/or other abilities (e.g., driving, riding a bike, walking/running) of a user.

In some embodiments, the AEFS is configured to identify threats (e.g., posed by vehicles to a user of a roadway, posed by a user to vehicles or other users of a roadway), and to provide information about such threats to a user so that he may take evasive action. Identifying threats may include analyzing information about a vehicle that is present in the roadway in order to determine whether the user and the vehicle may be on a collision course. The analyzed information may include or be represented by image data (e.g., pictures or video of a roadway and its surrounding environment), audio data (e.g., sounds reflected from or emitted by a vehicle), range information (e.g., provided by a sonar or infrared range sensor), conditions information (e.g., weather, temperature, time of day), or the like. The user may be a pedestrian (e.g., a walker, a jogger), an operator of a motorized (e.g., car, motorcycle, moped, scooter) or non-motorized vehicle (e.g., bicycle, pedicab, rickshaw), a vehicle passenger, or the like. In some embodiments, the vehicle may be operating autonomously. In some embodiments, the user wears a wearable device (e.g., a helmet, goggles, eyeglasses, hat) that is configured to at least present determined vehicular threat information to the user.

The AEFS may determine threats based on information received from various sources. Road-based sources may provide image, audio, or other types of data to the AEFS. The road-based sources may include sensors, devices, or systems that are deployed at, within, or about a roadway or intersection. For example, cameras, microphones, range sensors, velocity sensors, and the like may be affixed to utility or traffic signal support structures (e.g., poles, posts). As another example, induction coils embedded within a road can provide information to the AEFS about the presence and/or velocity of vehicles traveling over the road.

In some embodiments, the AEFS is configured to receive image data, at least some of which represents an image of a first vehicle. The image data may be obtained from various sources, including a camera of a wearable device of a user, a camera on a vehicle of the user, a road-side camera, a camera on some other vehicle, or the like. The image data may represent electromagnetic signals of various types or in various ranges, including visual signals (e.g., signals having a wavelength in the range of about 390-750 nm), infrared signals (e.g., signals having a wavelength in the range of about 750 nm-300 micrometers), or the like.

Then, the AEFS determines vehicular threat information based at least in part on the image data. In some embodiments, the AEFS may analyze the received image data in order to identify the first vehicle and/or to determine whether the first vehicle represents a threat to the user, such as because the first vehicle and the user may be on a collision course. The image data may be analyzed in various ways, including by identifying objects (e.g., to recognize that a vehicle or some other object is shown in the image data), determining motion-related information (e.g., position, velocity, acceleration, mass) about objects, or the like.

Next, the AEFS informs the user of the determined vehicular threat information via a wearable device of the user. Typically, the user's wearable device (e.g., a helmet) will include one or more output devices, such as audio speakers, visual display devices (e.g., warning lights, screens, heads-up displays), haptic devices, and the like. The AEFS may present the vehicular threat information via one or more of these output devices. For example, the AEFS may visually display or speak the words "Car on left." As another example, the AEFS may visually display a leftward pointing arrow on a heads-up screen displayed on a face screen of the user's helmet. Presenting the vehicular threat information may also or instead include presenting a recommended course of action (e.g., to slow down, to speed up, to turn) to mitigate the determined vehicular threat.

The AEFS may use other or additional sources or types of information. For example, in some embodiments, the AEFS is configured to receive data representing an audio signal emitted by a first vehicle. The audio signal is typically obtained in proximity to a user, who may be a pedestrian or traveling in a vehicle as an operator or a passenger. In some embodiments, the audio signal is obtained by one or more microphones coupled to a road-side structure, the user's vehicle and/or a wearable device of the user, such as a helmet, goggles, a hat, a media player, or the like. Then, the AEFS may determine vehicular threat information based at least in part on the data representing the audio signal. In some embodiments, the AEFS may analyze the received data in order to determine whether the first vehicle and the user are on a collision course. The audio data may be analyzed in various ways, including by performing audio analysis, frequency analysis (e.g., Doppler analysis), acoustic localization, or the like.

The AEFS may combine information of various types in order to determine threat information. For example, because image processing may be computationally expensive, rather than always processing all image data obtained from every possible source, the AEFS may use audio analysis to initially determine the approximate location of an oncoming vehicle, such as to the user's left, right, or rear. For example, having determined based on audio data that a vehicle may be approaching from the rear of the user, the AEFS may preferentially process image data from a rear-facing camera to further refine a threat analysis. As another example, the AEFS may incorporate information about the condition of a roadway (e.g., icy or wet) when determining whether a vehicle will be able to stop or maneuver in order to avoid an accident.

In some embodiments, an AEFS may utilize threat information received from other sources, including another AEFS. In particular, in some embodiments, vehicles and devices present in a transportation network may share threat information with one another in order to enhance the abilities of users of the transportation network. In this manner, increased processing power and enhanced responsiveness may be obtained from a network of devices operating in concert with one another.

In one embodiment, a first vehicle receives threat information from a remote device. The remote device may be or execute an AEFS, and may have a fixed (e.g., as a road-based device) or mobile (e.g., in another vehicle, worn by a pedestrian) position. The remote device may itself receive or utilize information from other devices, such as sensors (e.g., cameras, microphones, induction loops) or other computing devices that possibly execute another AEFS or some other system for determining threats.

The received threat information is typically based on information about objects or conditions proximate to the remote device. For example, where the remote device is a computing system located at an intersection, the computing system may process data received from various sensors that are deployed at or about the intersection. The information about objects or conditions may be or include image data, audio data, weather data, motion-related information, or the like.

In some embodiments, when a vehicle receives threat information, it determines whether the threat information is relevant to the safe operation of the vehicle. For example, the vehicle may receive threat information from an intersection-based device that is behind (and receding from) the vehicle. This information is likely not relevant to the vehicle, because the vehicle has already passed through the intersection. As another example, the vehicle may receive an indication of an icy road surface from a device that is ahead of the vehicle. This information is likely to be relevant, because the vehicle is approaching the location of the icy surface. Relevance may generally be determined based on various factors, including location, direction of travel, speed (e.g., an icy surface may not be relevant if the vehicle is moving very slowly), operator skill, or the like.

When a vehicle determines that received threat information is relevant, it may modify operation of the vehicle. Modifying vehicle operation may include presenting a message (e.g., a warning, an instruction) to the vehicle operator with regard to the threat. Modifying vehicle operation may also or instead include controlling the vehicle itself, such as by causing the vehicle to accelerate, decelerate, or turn.

1. Ability Enhancement Facilitator System Overview

FIGS. 1A and 1B are various views of an example ability enhancement scenario according to an example embodiment. More particularly, FIGS. 1A and 1B respectively are perspective and top views of a traffic scenario which may result in a collision between two vehicles.

FIG. 1A is a perspective view of an example traffic scenario according to an example embodiment. The illustrated scenario includes two vehicles 110a (a moped) and 110b (a motorcycle). The motorcycle 110b is being ridden by a user 104 who is wearing a wearable device 120a (a helmet). An Ability Enhancement Facilitator System ("AEFS") 100 is enhancing the ability of the user 104 to operate his vehicle 110b via the wearable device 120a. The example scenario also includes a traffic signal 106 upon which is mounted a camera 108.

In this example, the moped 110a is driving towards the motorcycle 110b from a side street, at approximately a right angle with respect to the path of travel of the motorcycle 110b. The traffic signal 106 has just turned from red to green for the motorcycle 110b, and the user 104 is beginning to drive the motorcycle 110 into the intersection controlled by the traffic signal 106. The user 104 is assuming that the moped 110a will stop, because cross traffic will have a red light. However, in this example, the moped 110a may not stop in a timely manner, for one or more reasons, such as because the operator of the moped 110a has not seen the red light, because the moped 110a is moving at an excessive rate, because the operator of the moped 110a is impaired, because the surface conditions of the roadway are icy or slick, or the like. As will be discussed further below, the AEFS 100 will determine that the moped 110a and the motorcycle 110b are likely on a collision course, and inform the user 104 of this threat via the helmet 120a, so that the user may take evasive action to avoid a possible collision with the moped 110a.

The moped 110 emits or reflects a signal 101. In some embodiments, the signal 101 is an electromagnetic signal in the visible light spectrum that represents an image of the moped 110a. Other types of electromagnetic signals may be received and processed, including infrared radiation, radio waves, microwaves, or the like. Other types of signals are contemplated, including audio signals, such as an emitted engine noise, a reflected sonar signal, a vocalization (e.g., shout, scream), etc. The signal 101 may be received by a receiving detector/device/sensor, such as a camera or microphone (not shown) on the helmet 120a and/or the motorcycle 110b. In some embodiments, a computing and communication device within the helmet 120a receives and samples the signal 101 and transmits the samples or other representation to the AEFS 100. In other embodiments, other forms of data may be used to represent the signal 101, including frequency coefficients, compressed audio/video, or the like.

The AEFS 100 determines vehicular threat information by analyzing the received data that represents the signal 101. If the signal 101 is a visual signal, then the AEFS 100 may employ various image data processing techniques. For example, the AEFS 100 may perform object recognition to determine that received image data includes an image of a vehicle, such as the moped 110a. The AEFS 100 may also or instead process received image data to determine motion-related information with respect to the moped 110, including position, velocity, acceleration, or the like. The AEFS 100 may further identify the presence of other objects, including pedestrians, animals, structures, or the like, that may pose a threat to the user 104 or that may be themselves threatened (e.g., by actions of the user 104 and/or the moped 110a). Image processing also may be employed to determine other information, including road conditions (e.g., wet or icy roads), visibility conditions (e.g., glare or darkness), and the like.

If the signal 101 is an audio signal, then the AEFS 100 may use one or more audio analysis techniques to determine the vehicular threat information. In one embodiment, the AEFS 100 performs a Doppler analysis (e.g., by determining whether the frequency of the audio signal is increasing or decreasing) to determine that the object that is emitting the audio signal is approaching (and possibly at what rate) the user 104. In some embodiments, the AEFS 100 may determine the type of vehicle (e.g., a heavy truck, a passenger vehicle, a motorcycle, a moped) by analyzing the received data to identify an audio signature that is correlated with a particular engine type or size. For example, a lower frequency engine sound may be correlated with a larger vehicle size, and a higher frequency engine sound may be correlated with a smaller vehicle size.

In one embodiment, where the signal 101 is an audio signal, the AEFS 100 performs acoustic source localization to determine information about the trajectory of the moped 110a, including one or more of position, direction of travel, speed, acceleration, or the like. Acoustic source localization may include receiving data representing the audio signal 101 as measured by two or more microphones. For example, the helmet 120a may include four microphones (e.g., front, right, rear, and left) that each receive the audio signal 101. These microphones may be directional, such that they can be used to provide directional information (e.g., an angle between the helmet and the audio source). Such directional information may then be used by the AEFS 100 to triangulate the position of the moped 110a. As another example, the AEFS 100 may measure differences between the arrival time of the audio signal 101 at multiple distinct microphones on the helmet 120a or other location. The difference in arrival time, together with information about the distance between the microphones, can be used by the AEFS 100 to determine distances between each of the microphones and the audio source, such as the moped 110a. Distances between the microphones and the audio source can then be used to determine one or more locations at which the audio source may be located.

Determining vehicular threat information may also or instead include obtaining information such as the position, trajectory, and speed of the user 104, such as by receiving data representing such information from sensors, devices, and/or systems on board the motorcycle 110b and/or the helmet 120a. Such sources of information may include a speedometer, a geo-location system (e.g., GPS system), an accelerometer, or the like. Once the AEFS 100 has determined and/or obtained information such as the position, trajectory, and speed of the moped 110a and the user 104, the AEFS 100 may determine whether the moped 110a and the user 104 are likely to collide with one another. For example, the AEFS 100 may model the expected trajectories of the moped 110a and user 104 to determine whether they intersect at or about the same point in time.

The AEFS 100 may then present the determined vehicular threat information (e.g., that the moped 110a represents a hazard) to the user 104 via the helmet 120a. Presenting the vehicular threat information may include transmitting the information to the helmet 120a, where it is received and presented to the user. In one embodiment, the helmet 120a includes audio speakers that may be used to output an audio signal (e.g., an alarm or voice message) warning the user 104. In other embodiments, the helmet 120a includes a visual display, such as a heads-up display presented upon a face screen of the helmet 120a, which can be used to present a text message (e.g., "Look left") or an icon (e.g., a red arrow pointing left).

As noted, the AEFS 100 may also use information received from road-based sensors and/or devices. For example, the AEFS 100 may use information received from a camera 108 that is mounted on the traffic signal 106 that controls the illustrated intersection. The AEFS 100 may receive image data that represents the moped 110a and/or the motorcycle 110b. The AEFS 100 may perform image recognition to determine the type and/or position of a vehicle that is approaching the intersection. The AEFS 100 may also or instead analyze multiple images (e.g., from a video signal) to determine the velocity of a vehicle. Other types of sensors or devices installed in or about a roadway may also or instead by used, including range sensors, speed sensors (e.g., radar guns), induction coils (e.g., loops mounted in the roadbed), temperature sensors, weather gauges, or the like.

FIG. 1B is a top view of the traffic scenario described with respect to FIG. 1A, above. FIG. 1B includes a legend 122 that indicates the compass directions. In this example, moped 110a is traveling eastbound and is about to enter the intersection. Motorcycle 110b is traveling northbound and is also about to enter the intersection. Also shown are the signal 101, the traffic signal 106, and the camera 108.

As noted above, the AEFS 100 may utilize data that represents a signal as detected by one or more detectors/sensors, such as microphones or cameras. In the example of FIG. 1B, the motorcycle 110b includes two sensors 124a and 124b, respectively mounted at the front left and front right of the motorcycle 110b.

In an image context, the AEFS 100 may perform image processing on image data obtained from one or more of the camera sensors 124a and 124b. As discussed, the image data may be processed to determine the presence of the moped, its type, its motion-related information (e.g., velocity), and the like. In some embodiments, image data may be processed without making any definite identification of a vehicle. For example, the AEFS 100 may process image data from sensors 124a and 124b to identify the presence of motion (without necessarily identifying any objects). Based on such an analysis, the AEFS 100 may determine that there is something approaching from the left of the motorcycle 110b, but that the right of the motorcycle 110b is relatively clear.

Differences between data obtained from multiple sensors may be exploited in various ways. In an image context, an image signal may be perceived or captured differently by the two (camera) sensors 124a and 124b. The AEFS 100 may exploit or otherwise analyze such differences to determine the location and/or motion of the moped 110a. For example, knowing the relative position and optical qualities of the two cameras, it is possible to analyze images captured by those cameras to triangulate a position of an object (e.g., the moped 110a) or a distance between the motorcycle 110b and the object.

In an audio context, an audio signal may be perceived differently by the two sensors 124a and 124b. For example, if the strength of the signal 101 is stronger as measured at microphone 124a than at microphone 124b, the AEFS 100 may infer that the signal 101 is originating from the driver's left of the motorcycle 110b, and thus that a vehicle is approaching from that direction. As another example, as the strength of an audio signal is known to decay with distance, and assuming an initial level (e.g., based on an average signal level of a vehicle engine) the AEFS 100 may determine a distance (or distance interval) between one or more of the microphones and the signal source.

The AEFS 100 may model vehicles and other objects, such as by representing their motion-related information, including position, speed, acceleration, mass and other properties. Such a model may then be used to determine whether objects are likely to collide. Note that the model may be probabilistic. For example the AEFS 100 may represent an object's position in space as a region that includes multiple positions that each have a corresponding likelihood that that the object is at that position. As another example, the AEFS 100 may represent the velocity of an object as a range of likely values, a probability distribution, or the like. Various frames of reference may be employed, including a user-centric frame, an absolute frame, or the like.

Figure 1C:
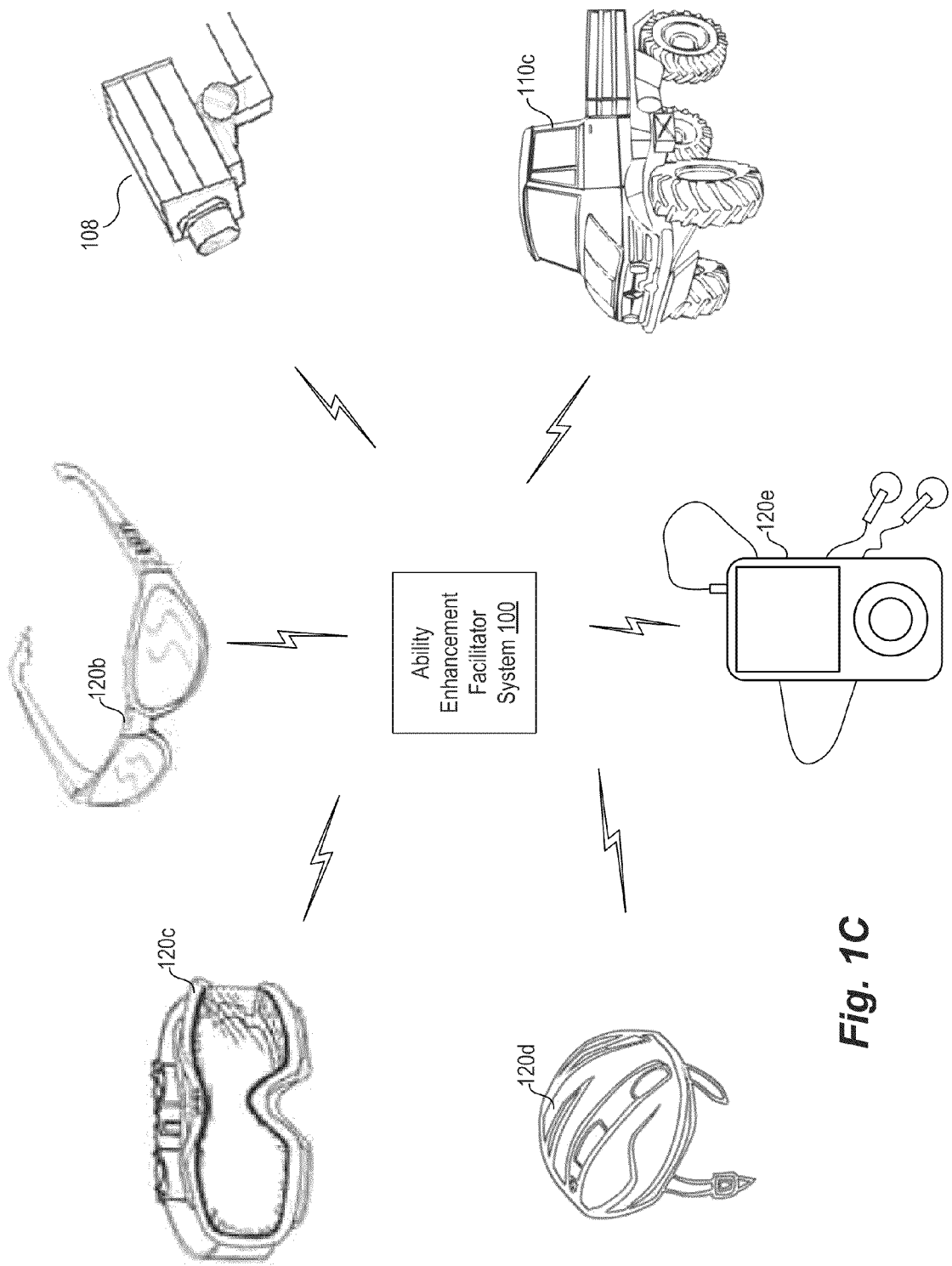
FIG. 1C is an example block diagram illustrating various devices in communication with an ability enhancement facilitator system according to example embodiments.

FIG. 1C is an example block diagram illustrating various devices in communication with an ability enhancement facilitator system according to example embodiments. In particular, FIG. 1C illustrates an AEFS 100 in communication with a variety of wearable devices 120b-120e, a camera 108, and a vehicle 110c.

The AEFS 100 may interact with various types of wearable devices 120, including a motorcycle helmet 120a (FIG. 1A), eyeglasses 120b, goggles 120c, a bicycle helmet 120d, a personal media device 120e, or the like. Wearable devices 120 may include any device modified to have sufficient computing and communication capability to interact with the AEFS 100, such as by presenting vehicular threat information received from the AEFS 100, providing data (e.g., audio data) for analysis to the AEFS 100, or the like.

In some embodiments, a wearable device may perform some or all of the functions of the AEFS 100, even though the AEFS 100 is depicted as separate in these examples. Some devices may have minimal processing power and thus perform only some of the functions. For example, the eyeglasses 120b may receive vehicular threat information from a remote AEFS 100, and display it on a heads-up display displayed on the inside of the lenses of the eyeglasses 120b. Other wearable devices may have sufficient processing power to perform more of the functions of the AEFS 100. For example, the personal media device 120e may have considerable processing power and as such be configured to perform acoustic source localization, collision detection analysis, or other more computational expensive functions.

Note that the wearable devices 120 may act in concert with one another or with other entities to perform functions of the AEFS 100. For example, the eyeglasses 120b may include a display mechanism that receives and displays vehicular threat information determined by the personal media device 120e. As another example, the goggles 120c may include a display mechanism that receives and displays vehicular threat information determined by a computing device in the helmet 120a or 120d. In a further example, one of the wearable devices 120 may receive and process audio data received by microphones mounted on the vehicle 110c.

The AEFS 100 may also or instead interact with vehicles 110 and/or computing devices installed thereon. As noted, a vehicle 110 may have one or more sensors or devices that may operate as (direct or indirect) sources of information for the AEFS 100. The vehicle 110c, for example, may include a speedometer, an accelerometer, one or more microphones, one or more range sensors, or the like. Data obtained by, at, or from such devices of vehicle 110c may be forwarded to the AEFS 100, possibly by a wearable device 120 of an operator of the vehicle 110c.

In some embodiments, the vehicle 110c may itself have or use an AEFS, and be configured to transmit warnings or other vehicular threat information to others. For example, an AEFS of the vehicle 110c may have determined that the moped 110a was driving with excessive speed just prior to the scenario depicted in FIG. 1B. The AEFS of the vehicle 110c may then share this information, such as with the AEFS 100. The AEFS 100 may accordingly receive and exploit this information when determining that the moped 110a poses a threat to the motorcycle 110b.

The AEFS 100 may also or instead interact with sensors and other devices that are installed on, in, or about roads or in other transportation related contexts, such as parking garages, racetracks, or the like. In this example, the AEFS 100 interacts with the camera 108 to obtain images of vehicles, pedestrians, or other objects present in a roadway. Other types of sensors or devices may include range sensors, infrared sensors, induction coils, radar guns, temperature gauges, precipitation gauges, or the like.

The AEFS 100 may further interact with information systems that are not shown in FIG. 1C. For example, the AEFS 100 may receive information from traffic information systems that are used to report traffic accidents, road conditions, construction delays, and other information about road conditions. The AEFS 100 may receive information from weather systems that provide information about current weather conditions. The AEFS 100 may receive and exploit statistical information, such as that drivers in particular regions are more aggressive, that red light violations are more frequent at particular intersections, that drivers are more likely to be intoxicated at particular times of day or year, or the like.

In some embodiments, the AEFS 100 may transmit information to law enforcement agencies and/or related computing systems. For example, if the AEFS 100 determines that a vehicle is driving erratically, it may transmit that fact along with information about the vehicle (e.g., make, model, color, license plate number, location) to a police computing system.

Note that in some embodiments, at least some of the described techniques may be performed without the utilization of any wearable devices 120. For example, a vehicle 110 may itself include the necessary computation, input, and output devices to perform functions of the AEFS 100. For example, the AEFS 100 may present vehicular threat information on output devices of a vehicle 110, such as a radio speaker, dashboard warning light, heads-up display, or the like. As another example, a computing device on a vehicle 110 may itself determine the vehicular threat information.

Figure 1D:
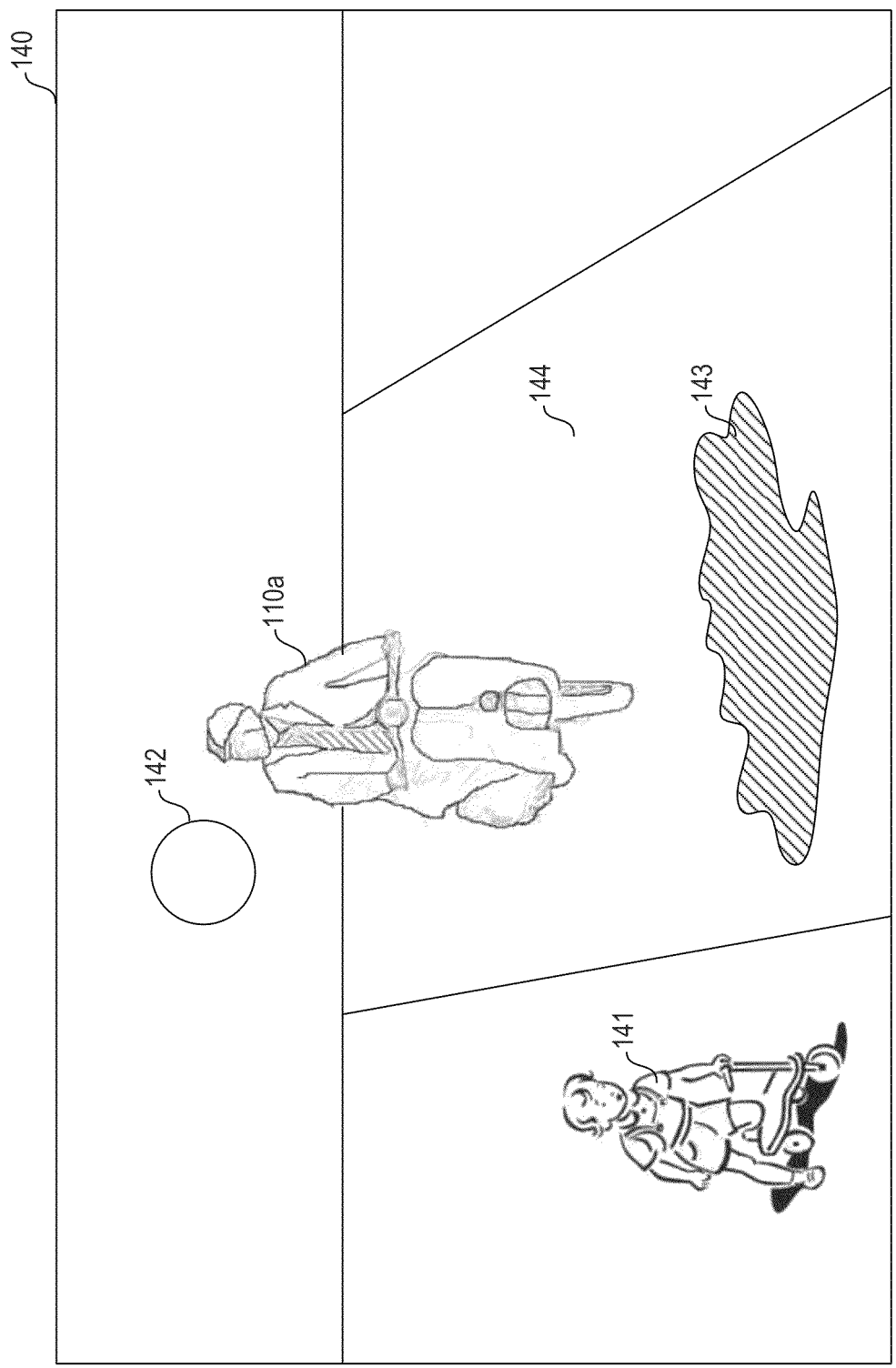
FIG. 1D is an example diagram illustrating an example image processed according to an example embodiment.

FIG. 1D is an example diagram illustrating an example image processed according to an example embodiment. In particular, FIG. 1D depicts an image 140 of the moped 110a. This image may be obtained from a camera (e.g., sensor 124a) on the left side of the motorcycle 110b in the scenario of FIG. 1B. The image may also or instead be obtained from camera 108 mounted on the traffic signal 106, as shown in FIG. 1B. Also visible in the image 140 are a child 141 on a scooter, the sun 142, and a puddle 143. The sun 142 is setting in the west, and is thus low in the sky, appearing nearly behind the moped 110a. In such conditions, visibility for the user 104 (not shown here) would be quite difficult.

In some embodiments, the AEFS 100 processes the image 140 to perform object identification. Upon processing the image 140, the AEFS 100 may identify the moped 110a, the child 141, the sun 142, the puddle 143, and/or the roadway 144. A sequence of images, taken at different times (e.g., one tenth of a second apart) may be used to determine that the moped 110a is moving, how fast the moped 110a is moving, acceleration/deceleration of the moped 110a, or the like. Motion of other objects, such as the child 141 may also be tracked. Based on such motion-related information, the AEFS 100 may model the physics of the identified objects to determine whether a collision is likely.

Determining vehicular threat information may also or instead be based on factors related or relevant to objects other than the moped 110a or the user 104. For example, the AEFS 100 may determine that the puddle 143 will likely make it more difficult for the moped 110a to stop. Thus, even if the moped 110a is moving at a reasonable speed, he still may be unable to stop prior to entering the intersection due to the presence of the puddle 143. As another example, the AEFS 100 may determine that evasive action by the user 104 and/or the moped 110a may cause injury to the child 141. As a further example, the AEFS 100 may determine that it may be difficult for the user 104 to see the moped 110a and/or the child 141 due to the position of the sun 142. Such information may be incorporated into any models, predictions, or determinations made or maintained by the AEFS 100.

FIG. 1E is a second example ability enhancement scenario according to an example embodiment. In particular, FIG. 1E is a top view of a traffic scenario that is similar to that shown in FIG. 1B. However, in FIG. 1E, rather than approaching each other from right angles (as in FIG. 1B), the moped 110a and the motorcycle 110b are heading towards each other, each in their respective lanes. FIG. 1E includes a legend 122 that indicates the compass directions. The moped 110a is east bound, and the motorcycle 110b is west bound. The driver of the motorcycle 110b wishes to turn left, across the path of the oncoming moped 110a.

The scenario of FIG. 1E may commonly result in an accident. Such is the case particularly during signal changes, because it is difficult for the driver of the motorcycle 110b to determine whether the moped 110a is slowing down (e.g., to stop for a yellow light) or speeding up (e.g., to beat the yellow light). In addition, visibility conditions may make it more difficult for the driver of the motorcycle 110b to determine the speed of the moped 110a. For example, if the sun is setting behind the moped 110a, then the driver of the motorcycle 110b may not even have a clear view of the moped 110a. Also, surface conditions may make it difficult for the moped 110a to stop if the driver of the motorcycle 110b does decide to make the left turn ahead of the moped 110a. For example, a wet or oily road surface may increase the braking distance of the moped 110a.

In this example, the AEFS 100 determines that the driver of the motorcycle 110b intends to make a left turn. This determination may be based on the fact that the motorcycle 110b is slowing down or has activated its turn signals. In some embodiments, when the driver activates a turn signal, an indication of the activation is transmitted to the AEFS 100. The AEFS 100 then receives information (e.g., image data) about the moped 110a from the camera 108 and possibly one or more other sources (e.g., a camera, microphone, or other device on the motorcycle 110b; a device on the moped 110a; a road-embedded device). By analyzing the image data, the AEFS 100 can estimate the motion-related information (e.g., position, speed, acceleration) about the moped 110a. Based on this motion-related information, the AEFS 100 can determine threat information such as whether the moped 110a is slowing to stop or instead attempting to speed through the intersection. The AEFS 100 can then inform the user of the determined threat information, as discussed further with respect to FIG. 1F, below.

Figure 1F:
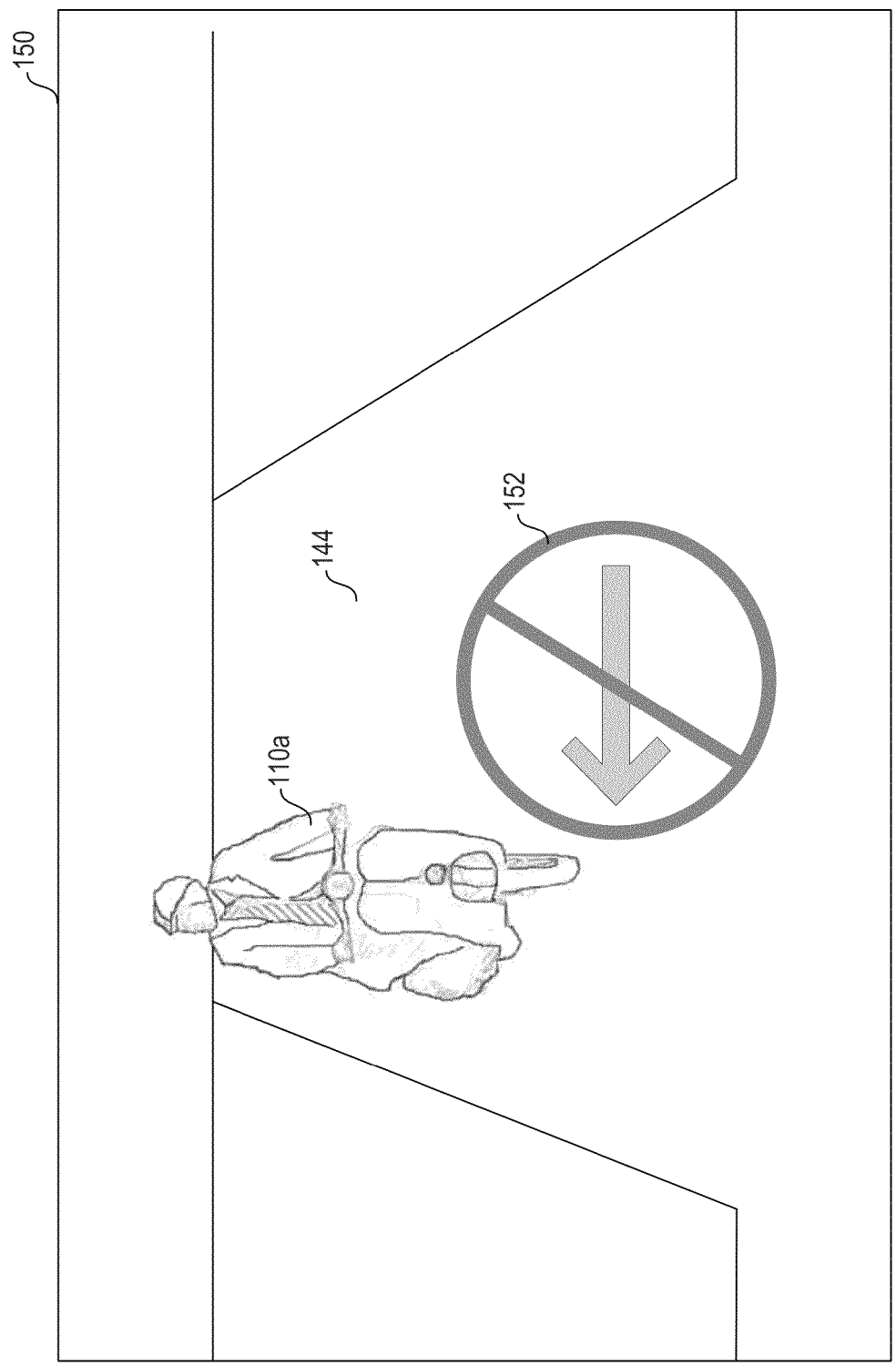
FIG. 1F is an example diagram illustrating an example user interface display according to an example embodiment.

FIG. 1F is an example diagram illustrating an example user interface display according to an example embodiment. FIG. 1F depicts a display 150 that includes a message 152. Also visible in the display 150 is the moped 110a and its driver, as well as the roadway 144.

The display 150 may be used by embodiments of the AEFS to present threat information to users. For example, as discussed with respect to the scenario of FIG. 1E, the AEFS may determine that the moped 110a is advancing too quickly for the motorcycle 110b to safely make a left turn. In response to this determination, the AEFS may present the message 152 on the display 150 in order to instruct the motorcycle 110b driver to avoid making a left turn in advance of the oncoming moped 110a. In this example, the message 152 is iconic and includes a left turn arrow surrounded by a circle with a line through it. Other types of messages and/or output modalities are contemplated, including textual (e.g., "No Turn"), audible (e.g., a chime, buzzer, alarm, or voice message), tactile (e.g., vibration of a steering wheel), or the like. The message 152 may be styled or decorated in various ways, including by use of colors, intermittence (e.g., flashing), size, or the like.

The display 150 may be provided in various ways. In one embodiment, the display 150 is presented by a heads-up display provided by a vehicle, such as the motorcycle 110b, a car, truck, or the like, where the display is presented on the wind screen or other surface. In another embodiment, the display 150 may be presented by a heads-up display provided by a wearable device, such as goggles or a helmet, where the display 150 is presented on a face or eye shield. In another embodiment, the display 150 may be presented by an LCD or similar screen in a dashboard or other portion of a vehicle.

Figure 2:
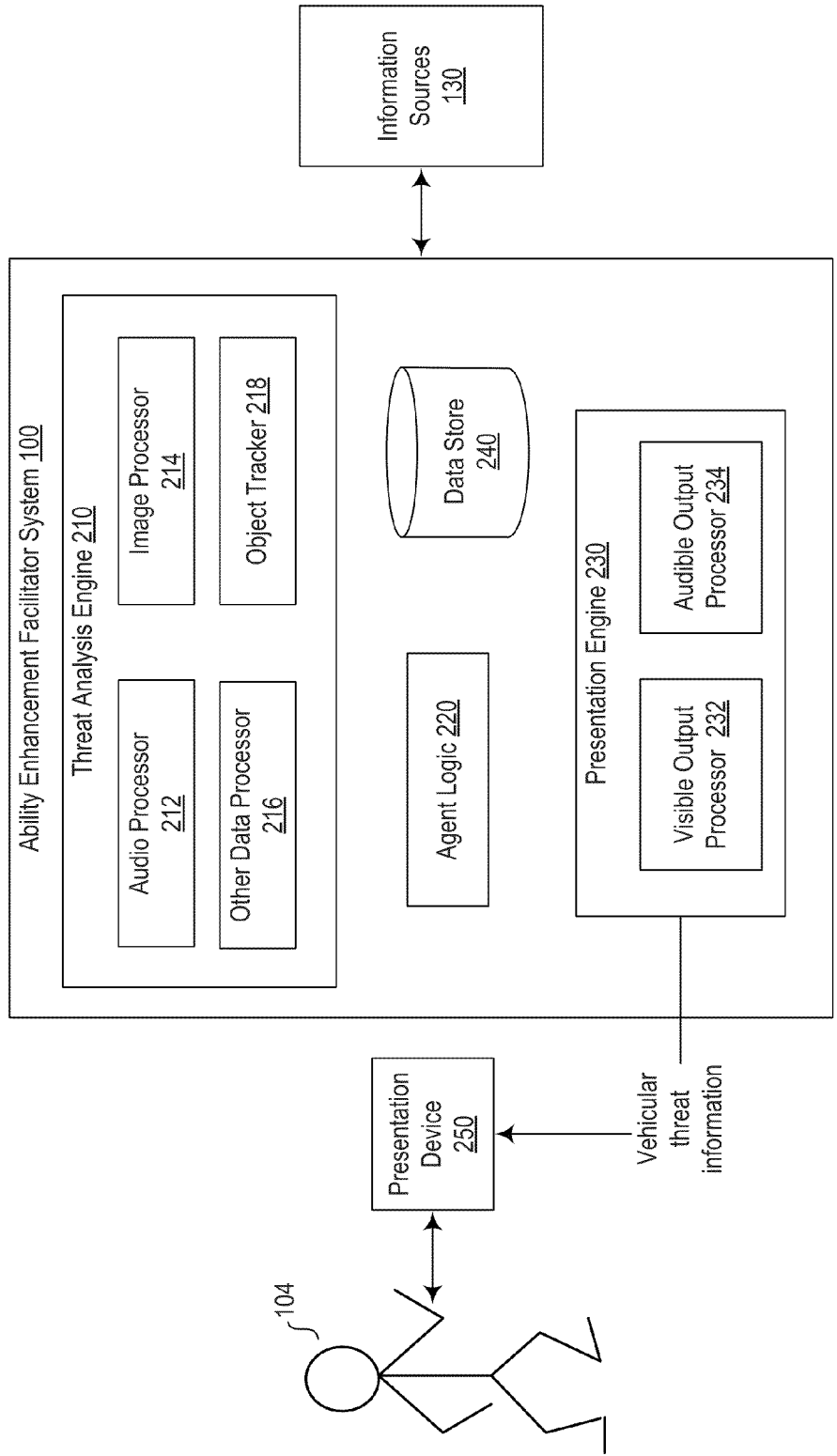
FIG. 2 is an example functional block diagram of an example ability enhancement facilitator system according to an example embodiment.

FIG. 2 is an example functional block diagram of an example ability enhancement facilitator system according to an example embodiment. In the illustrated embodiment of FIG. 2, the AEFS 100 includes a threat analysis engine 210, agent logic 220, a presentation engine 230, and a data store 240. The AEFS 100 is shown interacting with a presentation device 250 and information sources 130. The presentation device 250 may be part of a wearable device 120, part of a vehicle (e.g., a dashboard display, audio speaker, tactile feedback system), part of a road sign, or the like. The presentation device 250 is configured to provide one or more types of output, including visible, audible, tactile, or the like. The information sources 130 include any sensors, devices, systems, or the like that provide information to the AEFS 100, including but not limited to vehicle-based devices (e.g., speedometers), in-situ devices (e.g., road-side cameras), and information systems (e.g., traffic systems).

The threat analysis engine 210 includes an audio processor 212, an image processor 214, other sensor data processors 216, and an object tracker 218. In one example, the audio processor 212 processes audio data received from a wearable device 120. As noted, such data may be received from other sources as well or instead, including directly from a vehicle-mounted microphone, or the like. The audio processor 212 may perform various types of signal processing, including audio level analysis, frequency analysis, acoustic source localization, or the like. Based on such signal processing, the audio processor 212 may determine strength, direction of audio signals, audio source distance, audio source type, or the like. Outputs of the audio processor 212 (e.g., that an object is approaching from a particular angle) may be provided to the object tracker 218 and/or stored in the data store 240.

The image processor 214 receives and processes image data that may be received from sources such as a wearable device 120 and/or information sources 130. For example, the image processor 214 may receive image data from a camera of a wearable device 120, and perform object recognition to determine the type and/or position of a vehicle that is approaching the user 104. As another example, the image processor 214 may receive a video signal (e.g., a sequence or stream of images) and process them to determine the type, position, and/or velocity of a vehicle that is approaching the user 104. Multiple images may be processed to determine the presence or absence of motion, even if no object recognition is performed. Outputs of the image processor 214 (e.g., position and velocity information, vehicle type information) may be provided to the object tracker 218 and/or stored in the data store 240.

The other sensor data processor 216 receives and processes data received from other sensors or sources. For example, the other sensor data processor 216 may receive and/or determine information about the position and/or movements of the user and/or one or more vehicles, such as based on GPS systems, speedometers, accelerometers, or other devices. As another example, the other sensor data processor 216 may receive and process conditions information (e.g., temperature, precipitation) from the information sources 130 and determine that road conditions are currently icy. Outputs of the other sensor data processor 216 (e.g., that the user is moving at 5 miles per hour) may be provided to the object tracker 218 and/or stored in the data store 240.

The object tracker 218 manages a geospatial object model that includes information about objects known to the AEFS 100. The object tracker 218 receives and merges information about object types, positions, velocity, acceleration, direction of travel, and the like, from one or more of the processors 212, 214, 216, and/or other sources. Based on such information, the object tracker 218 may identify the presence of objects as well as their likely positions, paths, and the like. The object tracker 218 may continually update this model as new information becomes available and/or as time passes (e.g., by plotting a likely current position of an object based on its last measured position and trajectory). The object tracker 218 may also maintain confidence levels corresponding to elements of the geo-spatial model, such as a likelihood that a vehicle is at a particular position or moving at a particular velocity, that a particular object is a vehicle and not a pedestrian, or the like.

The agent logic 220 implements the core intelligence of the AEFS 100. The agent logic 220 may include a reasoning engine (e.g., a rules engine, decision trees, Bayesian inference engine) that combines information from multiple sources to determine vehicular threat information. For example, the agent logic 220 may combine information from the object tracker 218, such as that there is a determined likelihood of a collision at an intersection, with information from one of the information sources 130, such as that the intersection is the scene of common red-light violations, and decide that the likelihood of a collision is high enough to transmit a warning to the user 104. As another example, the agent logic 220 may, in the face of multiple distinct threats to the user, determine which threat is the most significant and cause the user to avoid the more significant threat, such as by not directing the user 104 to slam on the brakes when a bicycle is approaching from the side but a truck is approaching from the rear, because being rear-ended by the truck would have more serious consequences than being hit from the side by the bicycle.

The presentation engine 230 includes a visible output processor 232 and an audible output processor 234. The visible output processor 232 may prepare, format, and/or cause information to be displayed on a display device, such as a display of the presentation device 250 (e.g., a heads-up display of a vehicle 110 being driven by the user 104), a wearable device 120, or some other display. The agent logic 220 may use or invoke the visible output processor 232 to prepare and display information, such as by formatting or otherwise modifying vehicular threat information to fit on a particular type or size of display. The audible output processor 234 may include or use other components for generating audible output, such as tones, sounds, voices, or the like. In some embodiments, the agent logic 220 may use or invoke the audible output processor 234 in order to convert a textual message (e.g., a warning message, a threat identification) into audio output suitable for presentation via the presentation device 250, for example by employing a text-to-speech processor.

Note that one or more of the illustrated components/modules may not be present in some embodiments. For example, in embodiments that do not perform image or video processing, the AEFS 100 may not include an image processor 214. As another example, in embodiments that do not perform audio output, the AEFS 100 may not include an audible output processor 234.

Note also that the AEFS 100 may act in service of multiple users 104. In some embodiments, the AEFS 100 may determine vehicular threat information concurrently for multiple distinct users. Such embodiments may further facilitate the sharing of vehicular threat information. For example, vehicular threat information determined as between two vehicles may be relevant and thus shared with a third vehicle that is in proximity to the other two vehicles.

2. Example Processes

FIGS. 3.1-3.93 are example flow diagrams of ability enhancement processes performed by example embodiments.

FIG. 3.1 is an example flow diagram of example logic for enhancing ability in a transportation-related context. The illustrated logic in this and the following flow diagrams may be performed by, for example, one or more components of the AEFS 100 described with respect to FIG. 2, above. In general, one or more functions of the AEFS 100 may be performed at various locations, including at a wearable device, in a vehicle of a user, in some other vehicle, in a road-based computing system, a cloud-based computing system, or the like. In the illustrated example, at least some operations are performed at a vehicle, so that operation of the vehicle may be modified based on threat information received at the vehicle. More particularly, FIG. 3.1 illustrates a process 3.100 that includes operations performed by or at the following block(s).

At block 3.103, the process performs at a first vehicle, receiving threat information from a remote device, the threat information based at least in part on information about objects and/or conditions proximate to the remote device. In some embodiments, threat information determined by other devices or systems is received at the first vehicle. For example, the first vehicle may receive threat information from a road-based device that has determined that some other vehicle is driving erratically. As another example, the first vehicle may receive threat information from some other vehicle that has detected icy conditions on the roadway. The remote device may be any fixed device (e.g., at or about the roadway) or mobile device (e.g., located in another vehicle, on another person) that is capable of providing threat information to the process.

At block 3.106, the process performs determining that the threat information is relevant to safe operation of the first vehicle. The process may determine that the received threat information is relevant in various ways. For example, the process may determine whether the first vehicle is heading towards a location associated with the threat information (e.g., an upcoming intersection), and if so, present the threat information to the driver of the first vehicle.

At block 3.109, the process performs modifying operation of the first vehicle based on the threat information. Modifying the operation of the first vehicle may include presenting a message based on the threat information to the driver or other occupant of the first vehicle. Modifying the operation may also or instead include modifying controls (e.g., accelerator, brakes, steering wheel, lights) of the first vehicle.

FIG. 3.2 is an example flow diagram of example logic illustrating an example embodiment of process 3.100 of FIG. 3.1. More particularly, FIG. 3.2 illustrates a process 3.200 that includes the process 3.100, wherein the receiving threat information includes operations performed by or at one or more of the following block(s).

At block 3.202, the process performs receiving threat information determined based on information about driving conditions proximate to the remote device. Information about driving conditions may include or be based on weather information (e.g., snow, rain, ice, temperature), time information (e.g., night or day), lighting information (e.g., a light sensor indicating glare from the setting sun), or the like.

FIG. 3.3 is an example flow diagram of example logic illustrating an example embodiment of process 3.200 of FIG. 3.2. More particularly, FIG. 3.3 illustrates a process 3.300 that includes the process 3.200, wherein the information about driving conditions indicates that icy surface conditions are present proximate to the remote device. Icy surface conditions may be detected directly or inferred, such as based upon ambient temperature, humidity/precipitation, and the like.

FIG. 3.4 is an example flow diagram of example logic illustrating an example embodiment of process 3.200 of FIG. 3.2. More particularly, FIG. 3.4 illustrates a process 3.400 that includes the process 3.200, wherein the information about driving conditions indicates that wet surface conditions are present proximate to the remote device. Wet surface conditions may be detected directly or inferred, such as based on reports of precipitation received from a weather system.

FIG. 3.5 is an example flow diagram of example logic illustrating an example embodiment of process 3.200 of FIG. 3.2. More particularly, FIG. 3.5 illustrates a process 3.500 that includes the process 3.200, wherein the information about driving conditions indicates that oily surface conditions are present proximate to the remote device.

FIG. 3.6 is an example flow diagram of example logic illustrating an example embodiment of process 3.200 of FIG. 3.2. More particularly, FIG. 3.6 illustrates a process 3.600 that includes the process 3.200, wherein the information about driving conditions indicates that a limited visibility condition is present proximate to the remote device. Limited visibility may be due to the time of day (e.g., at dusk, dawn, or night), weather (e.g., fog, rain), or the like.

FIG. 3.7 is an example flow diagram of example logic illustrating an example embodiment of process 3.200 of FIG. 3.2. More particularly, FIG. 3.7 illustrates a process 3.700 that includes the process 3.200, wherein the information about driving conditions indicates that there is an accident proximate to the remote device. The presence of an accident may be determined based on information received from vehicle devices (e.g., accelerometers) that are configured to detect accidents, such as based on sudden deceleration.

FIG. 3.8 is an example flow diagram of example logic illustrating an example embodiment of process 3.100 of FIG. 3.1. More particularly, FIG. 3.8 illustrates a process 3.800 that includes the process 3.100, wherein the receiving threat information includes operations performed by or at one or more of the following block(s).

At block 3.802, the process performs receiving threat information determined based on information about a second vehicle proximate to the remote device. The information about the second vehicle may be or indicate unusual or out of the ordinary conditions with respect to the second vehicle, such as that the second vehicle is driving erratically, with excessive speed, or the like. The information about the second vehicle may be motion-related information (e.g., velocity, trajectory) or higher-order information, such as a determination that the second vehicle is driving erratically.

FIG. 3.9 is an example flow diagram of example logic illustrating an example embodiment of process 3.800 of FIG. 3.8. More particularly, FIG. 3.9 illustrates a process 3.900 that includes the process 3.800, wherein the information about a second vehicle indicates that the second vehicle is driving erratically. Erratic driving may be based on observations such as that the second vehicle is not staying within traffic lanes, is driving too slowly/quickly as compared to surrounding traffic, is not maintaining a uniform speed, or the like.

FIG. 3.10 is an example flow diagram of example logic illustrating an example embodiment of process 3.800 of FIG. 3.8. More particularly, FIG. 3.10 illustrates a process 3.1000 that includes the process 3.800, wherein the information about a second vehicle indicates that the second vehicle is driving with excessive speed. Excessive speed may be determined relatively, such as with respect to the average traffic speed on a road segment, posted speed limit, or the like. For example, a vehicle may be determined to be driving with excessive speed if the vehicle is driving more than 20% over a historical average speed for the road segment. Other thresholds (e.g., 10% over, 25% over) and/or baselines (e.g., average observed speed at a particular time of day) are contemplated. As another example, a vehicle may be determined to be driving with excessive speed if the vehicle is driving more than one standard deviation over the historical average speed. Other baselines may be employed, including average speed for a particular time of day, average speed measured over a time window (e.g., 5 or 10 minutes) preceding the current time, or the like. Similar techniques may be employed to determine if a vehicle is traveling too slowly.

FIG. 3.11 is an example flow diagram of example logic illustrating an example embodiment of process 3.800 of FIG. 3.8. More particularly, FIG. 3.11 illustrates a process 3.1100 that includes the process 3.800, wherein the information about a second vehicle indicates that the second vehicle is driving too slowly. Similar techniques to those discussed with respect to determining excessive speed, above, may be employed to determine whether a vehicle is driving too slowly.

FIG. 3.12 is an example flow diagram of example logic illustrating an example embodiment of process 3.100 of FIG. 3.1. More particularly, FIG. 3.12 illustrates a process 3.1200 that includes the process 3.100, wherein the receiving threat information includes operations performed by or at one or more of the following block(s).

At block 3.1202, the process performs receiving threat information determined based on information about a pedestrian proximate to the remote device. The information about the pedestrian may be or be based on an image of the pedestrian, an audio signal received from the pedestrian, an infrared heat signal of the pedestrian, location information received from a mobile device of the pedestrian, or the like.

FIG. 3.13 is an example flow diagram of example logic illustrating an example embodiment of process 3.1200 of FIG. 3.12. More particularly, FIG. 3.13 illustrates a process 3.1300 that includes the process 3.1200, wherein the information about a pedestrian indicates that a pedestrian is present in a roadway proximate to the remote device. Image processing techniques may be employed to determine whether a given image shows a pedestrian in a roadway. In another embodiment, the pedestrian may have a mobile device that transmits location information, which may be used to determine that the pedestrian is present in the roadway.

FIG. 3.14 is an example flow diagram of example logic illustrating an example embodiment of process 3.100 of FIG. 3.1. More particularly, FIG. 3.14 illustrates a process 3.1400 that includes the process 3.100, wherein the receiving threat information includes operations performed by or at one or more of the following block(s).

At block 3.1402, the process performs receiving threat information determined based on information about an object in a roadway proximate to the remote device. Other objects, including animals, refuse, tree limbs, parked vehicles, or the like may be considered.

FIG. 3.15 is an example flow diagram of example logic illustrating an example embodiment of process 3.100 of FIG. 3.1. More particularly, FIG. 3.15 illustrates a process 3.1500 that includes the process 3.100, wherein the receiving threat information includes operations performed by or at one or more of the following block(s).

At block 3.1502, the process performs receiving threat information determined at a second vehicle with respect to information about objects and/or conditions received at the second vehicle. In some embodiments, the threat information is determined by a second vehicle, such as by an AEFS or similar system that is present in the second vehicle (e.g., on a mobile device of an occupant or installed in the vehicle). In this manner, efforts made by other systems to determine threat information may be shared with this process, as well as possibly other systems, devices, or processes.

FIG. 3.16 is an example flow diagram of example logic illustrating an example embodiment of process 3.1500 of FIG. 3.15. More particularly, FIG. 3.16 illustrates a process 3.1600 that includes the process 3.1500, wherein the receiving threat information determined at a second vehicle includes operations performed by or at one or more of the following block(s).

At block 3.1602, the process performs receiving threat information determined by a wearable device of an occupant of the second vehicle. In some embodiments, the occupant of the second vehicle has a wearable device that executes an AEFS or similar system to determine the threat information. This threat information is then transmitted to, and received by, the process.

FIG. 3.17 is an example flow diagram of example logic illustrating an example embodiment of process 3.1500 of FIG. 3.15. More particularly, FIG. 3.17 illustrates a process 3.1700 that includes the process 3.1500, wherein the receiving threat information determined at a second vehicle includes operations performed by or at one or more of the following block(s).

At block 3.1702, the process performs receiving threat information determined by a computing device installed in the second vehicle. In some embodiments, the second vehicle includes a computing device that executes an AEFS or similar system to determine the threat information. This threat information is then transmitted to, and received by, the process.

FIG. 3.18 is an example flow diagram of example logic illustrating an example embodiment of process 3.1500 of FIG. 3.15. More particularly, FIG. 3.18 illustrates a process 3.1800 that includes the process 3.1500, wherein the receiving threat information determined at a second vehicle includes operations performed by or at one or more of the following block(s).

At block 3.1802, the process performs receiving motion-related information from a sensor attached to the second vehicle. The motion-related information may include information about the mechanics (e.g., position, velocity, acceleration, mass) of the second vehicle. Various types of sensors are contemplated, including speedometers, GPS receivers, accelerometers, and the like.

FIG. 3.19 is an example flow diagram of example logic illustrating an example embodiment of process 3.1800 of FIG. 3.18. More particularly, FIG. 3.19 illustrates a process 3.1900 that includes the process 3.1800, wherein the receiving motion-related information includes operations performed by or at one or more of the following block(s).

At block 3.1902, the process performs receiving position information from a position sensor of the second vehicle. In some embodiments, a GPS receiver, dead reckoning, or some combination thereof may be used to track the position of the first vehicle as it moves down the roadway.

FIG. 3.20 is an example flow diagram of example logic illustrating an example embodiment of process 3.1800 of FIG. 3.18. More particularly, FIG. 3.20 illustrates a process 3.2000 that includes the process 3.1800, wherein the receiving motion-related information includes operations performed by or at one or more of the following block(s).

At block 3.2002, the process performs receiving velocity information from a velocity sensor of the second vehicle. In some embodiments, a GPS receiver, a speedometer or other device is employed to determine the velocity of the second vehicle.

FIG. 3.21 is an example flow diagram of example logic illustrating an example embodiment of process 3.100 of FIG. 3.1. More particularly, FIG. 3.21 illustrates a process 3.2100 that includes the process 3.100, wherein the receiving threat information includes operations performed by or at one or more of the following block(s).

At block 3.2102, the process performs receiving threat information determined by a road-based device with respect to information about objects and/or conditions received at the road-based device. In some embodiments, the threat information is determined by a road-based device, such as a sensor or computing device. For example a computing device located at an intersection may determine threat information about vehicles and other objects entering into the intersection. This threat information may be shared with vehicles in the vicinity of the intersection, including the first vehicle. In this manner, efforts made by other systems to determine threat information may be shared with this process, as well as possibly other systems, devices, or processes.

FIG. 3.22 is an example flow diagram of example logic illustrating an example embodiment of process 3.2100 of FIG. 3.21. More particularly, FIG. 3.22 illustrates a process 3.2200 that includes the process 3.2100, wherein the receiving threat information determined by a road-based device includes operations performed by or at one or more of the following block(s).

At block 3.2202, the process performs receiving threat information determined by a road-based computing device configured to receive the information about objects and/or conditions from vehicles proximate to the road-based computing device. The road-based device may be a computing device that executes an AEFS or similar system, and that shares determined threat information with the process, as well as other systems in the vicinity of the road-based device. The road-based device may receive information from vehicles, such as motion-related information that can be employed to track and/or predict the motion of those vehicles. The road-based device may be place at or about locations that are frequent accident sites, such as intersections, blind corners, or the like.

FIG. 3.23 is an example flow diagram of example logic illustrating an example embodiment of process 3.2100 of FIG. 3.21. More particularly, FIG. 3.23 illustrates a process 3.2300 that includes the process 3.2100, wherein the receiving threat information determined by a road-based device includes operations performed by or at one or more of the following block(s).

At block 3.2302, the process performs receiving threat information determined by a road-based computing device configured to receive the information about objects and/or conditions from road-based sensors. The road-based computing device may receive information from road-based sensors, such as items attached to structures or embedded in the roadway, including cameras, ranging devices, speed sensors, or the like.

FIG. 3.24 is an example flow diagram of example logic illustrating an example embodiment of process 3.2100 of FIG. 3.21. More particularly, FIG. 3.24 illustrates a process 3.2400 that includes the process 3.2100, wherein the road-based device is a sensor attached to a structure proximate to the first vehicle. In some embodiments, the road-based device is attached to a building, utility pole, or some other fixed structure.

FIG. 3.25 is an example flow diagram of example logic illustrating an example embodiment of process 3.2400 of FIG. 3.24. More particularly, FIG. 3.25 illustrates a process 3.2500 that includes the process 3.2400, wherein the structure proximate to the first vehicle is one of a utility pole, a traffic control signal support, a building, a street light, a tunnel wall, a bridge, an overpass, a flyover, a communication tower, a traffic kiosk, an advertisement structure, a roadside sign, an information/regulatory display, and/or a vehicle toll reader.

FIG. 3.26 is an example flow diagram of example logic illustrating an example embodiment of process 3.2400 of FIG. 3.24. More particularly, FIG. 3.26 illustrates a process 3.2600 that includes the process 3.2400, wherein the receiving threat information determined by a road-based device includes operations performed by or at one or more of the following block(s).

At block 3.2602, the process performs receiving an image of a second vehicle from a camera deployed at an intersection. For example, the process may receive images of a second vehicle from a camera that is fixed to a traffic light or other signal at an intersection near the first vehicle.

FIG. 3.27 is an example flow diagram of example logic illustrating an example embodiment of process 3.2400 of FIG. 3.24. More particularly, FIG. 3.27 illustrates a process 3.2700 that includes the process 3.2400, wherein the receiving threat information determined by a road-based device includes operations performed by or at one or more of the following block(s).

At block 3.2702, the process performs receiving ranging data from a range sensor deployed at an intersection, the ranging data representing a distance between a second vehicle and the intersection. For example, the process may receive a distance (e.g., 75 meters) measured between some known point in the intersection (e.g., the position of the range sensor) and an oncoming vehicle.

FIG. 3.28 is an example flow diagram of example logic illustrating an example embodiment of process 3.2400 of FIG. 3.24. More particularly, FIG. 3.28 illustrates a process 3.2800 that includes the process 3.2400, wherein the road-based device includes a camera. The camera may provide images of the vehicles and other objects or conditions, which may be analyzed to determine the threat information, as discussed herein.

FIG. 3.29 is an example flow diagram of example logic illustrating an example embodiment of process 3.2400 of FIG. 3.24. More particularly, FIG. 3.29 illustrates a process 3.2900 that includes the process 3.2400, wherein the road-based device includes a microphone. The microphone may provide audio information that may be used to perform acoustic source localization, as discussed herein.

FIG. 3.30 is an example flow diagram of example logic illustrating an example embodiment of process 3.2400 of FIG. 3.24. More particularly, FIG. 3.30 illustrates a process 3.3000 that includes the process 3.2400, wherein the road-based device includes a radar gun. The radar gun may provide distance and/or velocity information to the process.

FIG. 3.31 is an example flow diagram of example logic illustrating an example embodiment of process 3.2400 of FIG. 3.24. More particularly, FIG. 3.31 illustrates a process 3.3100 that includes the process 3.2400, wherein the road-based device includes a range sensor. Various types of range sensors are contemplated, including laser-based, sonar-based, infrared, and the like.

FIG. 3.32 is an example flow diagram of example logic illustrating an example embodiment of process 3.2400 of FIG. 3.24. More particularly, FIG. 3.32 illustrates a process 3.3200 that includes the process 3.2400, wherein the road-based device includes a receiver operable to receive motion-related information transmitted from a second vehicle, the motion-related information including at least one of a position of the second vehicle, a velocity of the second vehicle, and/or a trajectory of the second vehicle. In some embodiments, vehicles and/or other entities (e.g., pedestrians) traveling the roadway broadcast or otherwise transmit motion-related information, such as information about position and/or speed of a vehicle. The process may receive such information and use it to model the trajectories of various objects in the roadway to determine whether collisions are likely to occur.

FIG. 3.33 is an example flow diagram of example logic illustrating an example embodiment of process 3.2100 of FIG. 3.21. More particularly, FIG. 3.33 illustrates a process 3.3300 that includes the process 3.2100, wherein the road-based device is embedded in a roadway. The road-based device may be embedded, buried, or located beneath the surface of the roadway.

FIG. 3.34 is an example flow diagram of example logic illustrating an example embodiment of process 3.3300 of FIG. 3.33. More particularly, FIG. 3.34 illustrates a process 3.3400 that includes the process 3.3300, wherein the road-based device includes an induction loop embedded in the roadway, the induction loop configured to detect the presence and/or velocity of a second vehicle. An induction loop detects the presence of a vehicle by generating an electrical current as the vehicle passes over the loop.

FIG. 3.35 is an example flow diagram of example logic illustrating an example embodiment of process 3.3400 of FIG. 3.34. More particularly, FIG. 3.35 illustrates a process 3.3500 that includes the process 3.3400, wherein the receiving threat information determined by a road-based device includes operations performed by or at one or more of the following block(s).

At block 3.3502, the process performs receiving motion-related information from the induction loop, the motion-related information including at least one of a position of the second vehicle, a velocity of the second vehicle, and/or a trajectory of the second vehicle. As noted, induction loops may be embedded in the roadway and configured to detect the presence of vehicles passing over them. Some types of loops and/or processing may be employed to detect other information, including velocity, vehicle size, and the like. Multiple induction loops may be configured to work in concert to measure, for example, vehicle velocity.

FIG. 3.36 is an example flow diagram of example logic illustrating an example embodiment of process 3.100 of FIG. 3.1. More particularly, FIG. 3.36 illustrates a process 3.3600 that includes the process 3.100, wherein the determining that the threat information is relevant to safe operation of the first vehicle includes operations performed by or at one or more of the following block(s).

At block 3.3602, the process performs determining a location associated with the remote device. In some embodiments, determining the threat information may be based on the relative locations of the first vehicle and the remote device. In general, the closer the first vehicle is to the remote device, the more likely that the threat information provided by that remote device is relevant to the first vehicle. For example, threat information provided by a device being approached by the first vehicle is likely to be more relevant than threat information provided by a device that is behind the first vehicle. The location may be expressed as a point or a region (e.g., a polygon, circle).

At block 3.3605, the process performs determining whether the first vehicle is approaching the location. The process may use information about the current position and direction of travel of the first vehicle (e.g., provided by a GPS receiver) and the location of the remote device.

FIG. 3.37 is an example flow diagram of example logic illustrating an example embodiment of process 3.3600 of FIG. 3.36. More particularly, FIG. 3.37 illustrates a process 3.3700 that includes the process 3.3600, wherein the location associated with the remote device includes the location of a road-based device. As noted, various types of road-based devices may be used, including computing devices, cameras, range sensors, induction loops, and the like.

FIG. 3.38 is an example flow diagram of example logic illustrating an example embodiment of process 3.3600 of FIG. 3.36. More particularly, FIG. 3.38 illustrates a process 3.3800 that includes the process 3.3600, wherein the location associated with the remote device includes a location of a second vehicle that includes the remote device. For example, the location may be a current or past location of a second vehicle that includes the remote device (e.g., speed sensor, range sensor).

FIG. 3.39 is an example flow diagram of example logic illustrating an example embodiment of process 3.3600 of FIG. 3.36. More particularly, FIG. 3.39 illustrates a process 3.3900 that includes the process 3.3600, wherein the determining whether the first vehicle is approaching the location includes operations performed by or at one or more of the following block(s).

At block 3.3902, the process performs determining whether the first vehicle is within a threshold distance from the location associated with the remote device. The process may determine whether the distance between the first vehicle and the device location is less than a threshold number. The threshold number may be a fixed number (e.g., 10, 20, 50, 100 meters) or be based on various factors including vehicle speeds, surface conditions, driver skill level, and the like. For example, a higher threshold number may be used if the surface conditions are icy and thus require a greater stopping distance.

FIG. 3.40 is an example flow diagram of example logic illustrating an example embodiment of process 3.3600 of FIG. 3.36. More particularly, FIG. 3.40 illustrates a process 3.4000 that includes the process 3.3600, wherein the determining whether the first vehicle is approaching the location includes operations performed by or at one or more of the following block(s).

At block 3.4002, the process performs determining whether the first vehicle is moving on trajectory that intersects the location associated with the remote device. The process may determine that the threat information is relevant if the first vehicle is moving on a trajectory that intersects (or nearly intersects) the location. In this manner, threat information about locations that are behind or to the side of the vehicle may be ignored or filtered out.

FIG. 3.41 is an example flow diagram of example logic illustrating an example embodiment of process 3.100 of FIG. 3.1. More particularly, FIG. 3.41 illustrates a process 3.4100 that includes the process 3.100, wherein the determining that the threat information is relevant to safe operation of the first vehicle includes operations performed by or at one or more of the following block(s).

At block 3.4102, the process performs determining a threat to the first vehicle based on the threat information. The process may determine that the threat represented by the threat information is also a threat to the first vehicle. For example, if the threat information identifies an erratic vehicle, that erratic vehicle may also pose a threat to the first vehicle. Alternatively, the process may determine a distinct threat to the first vehicle based on a threat represented by the threat information. For example, the threat information may indicate that the setting sun is causing a visibility problem for a second vehicle that happens to be approaching the first vehicle. From this, the process may infer that the second vehicle poses a threat (because the driver cannot see) to the first vehicle, even though the setting sun does not in and of itself pose a direct problem or threat for the first vehicle.

At block 3.4105, the process performs determining a likelihood associated with the threat. In some embodiments, probabilities may be associated with threats, based on various factors, such as levels of uncertainty associated with measurements or other data used by the process, aggregate risk levels (e.g., number of accidents per year in a given intersection), or the like.

At block 3.4108, the process performs determining that the likelihood is greater than a threshold level. The process may determine that threat information is relevant when the likelihood is above a particular threshold. The threshold may be fixed (e.g., 10%, 20%) or based on various factors including vehicle speeds, surface conditions, driver skill level, and the like.

FIG. 3.42 is an example flow diagram of example logic illustrating an example embodiment of process 3.4100 of FIG. 3.41. More particularly, FIG. 3.42 illustrates a process 3.4200 that includes the process 3.4100, wherein the determining a threat to the first vehicle based on the threat information includes operations performed by or at one or more of the following block(s).

At block 3.4202, the process performs predicting a path of an object identified by the threat information. The process may model the path of the object by using motion-related information obtained about or provided by the object. The path may include a vector that represents velocity and direction of travel. The path may also represent at-rest, non-moving objects.

At block 3.4204, the process performs predicting a path of the first vehicle. Similarly, the process may model the path of the first vehicle based on motion-related information.

At block 3.4206, the process performs determining, based on the paths of the object and the first vehicle, whether the first vehicle and the object will come within a threshold distance of one another. A threshold distance may be used to detect situations in which even though there is no collision, the first vehicle and the object pass uncomfortably close to one another (e.g., a "near miss"). Different thresholds are contemplated, including 0, 10 cm, 25 cm, and 1 m.

FIG. 3.43 is an example flow diagram of example logic illustrating an example embodiment of process 3.4100 of FIG. 3.41. More particularly, FIG. 3.43 illustrates a process 3.4300 that includes the process 3.4100, wherein the determining a likelihood associated with the threat includes operations performed by or at one or more of the following block(s).

At block 3.4302, the process performs determining a likelihood that the first vehicle will collide with a second vehicle identified by the threat information. In some cases, the object identified by the threat information may be a second vehicle, and the process may determine a likelihood of collision, based on current positions and trajectories of the two vehicles, uncertainty about the data used to determine the trajectories, and/or other factors.

FIG. 3.44 is an example flow diagram of example logic illustrating an example embodiment of process 3.4100 of FIG. 3.41. More particularly, FIG. 3.44 illustrates a process 3.4400 that includes the process 3.4100, wherein the determining a likelihood associated with the threat includes operations performed by or at one or more of the following block(s).

At block 3.4402, the process performs determining a likelihood that the first vehicle will collide with a pedestrian identified by the threat information. In some cases, the object identified by the threat information may be a pedestrian, and the process may determine a likelihood of collision between the first vehicle and the pedestrian, based on current positions and trajectories, uncertainty about the data used to determine the trajectories, and/or other factors.

FIG. 3.45 is an example flow diagram of example logic illustrating an example embodiment of process 3.4100 of FIG. 3.41. More particularly, FIG. 3.45 illustrates a process 3.4500 that includes the process 3.4100, wherein the determining a likelihood associated with the threat includes operations performed by or at one or more of the following block(s).

At block 3.4502, the process performs determining a likelihood that the first vehicle will collide with an animal identified by the threat information.

FIG. 3.46 is an example flow diagram of example logic illustrating an example embodiment of process 3.4100 of FIG. 3.41. More particularly, FIG. 3.46 illustrates a process 3.4600 that includes the process 3.4100, wherein the determining a likelihood associated with the threat includes operations performed by or at one or more of the following block(s).

At block 3.4602, the process performs determining a likelihood that surface conditions identified by the threat information will cause an operator to lose control of the first vehicle. In some cases, the threat information will identify hazard surface conditions, such as ice. The process may determine a likelihood that the operator of the first vehicle will not be able to control the vehicle in the presence of such surface conditions. Such a likelihood may be based on various factors, such as whether the vehicle is presently turning (and thus more likely to spin out in the presence of ice), whether the vehicle is braking, or the like. The likelihood may also be based on the specific type of surface condition, with icy conditions resulting in higher likelihoods than wet conditions, for example.

FIG. 3.47 is an example flow diagram of example logic illustrating an example embodiment of process 3.100 of FIG. 3.1. More particularly, FIG. 3.47 illustrates a process 3.4700 that includes the process 3.100, wherein the determining that the threat information is relevant to safe operation of the first vehicle includes operations performed by or at one or more of the following block(s).

At block 3.4702, the process performs determining that the threat information is relevant based on gaze information associated with an operator of the first vehicle. In some embodiments, the process may consider the direction in which the vehicle operator is looking when determining that the threat information is relevant. For example, the threat information may depend on whether the operator is or is not looking in the direction of a threat (e.g., another vehicle) identified by the threat information, as discussed further below.

FIG. 3.48 is an example flow diagram of example logic illustrating an example embodiment of process 3.4700 of FIG. 3.47. More particularly, FIG. 3.48 illustrates a process 3.4800 that includes the process 3.4700, and which further includes operations performed by or at the following blocks(s).

At block 3.4802, the process performs determining that the operator has not looked at the road for more than a threshold amount of time. In some cases, the process may consider whether the operator has taken his eyes off the road, such as to adjust the car radio, attend to a mobile phone, or the like.

FIG. 3.49 is an example flow diagram of example logic illustrating an example embodiment of process 3.4700 of FIG. 3.47. More particularly, FIG. 3.49 illustrates a process 3.4900 that includes the process 3.4700, and which further includes operations performed by or at the following blocks(s).

At block 3.4902, the process performs receiving an indication of a direction in which the operator is looking. In some embodiments, an orientation sensor such as a gyroscope or accelerometer may be employed to determine the orientation of the operator's head, face, eyes, or other body part. In some embodiments, a camera or other image sensing device may track the orientation of the operator's eyes.

At block 3.4904, the process performs determining that the operator is not looking towards an approaching second vehicle. As noted, received threat information (or a tracking system of employed by the process) may indicate the position of a second vehicle. Given this information, coupled with information about the direction of the operator's gaze, the process may determine whether or not the operator is (or likely is) looking in the direction of the second vehicle.

At block 3.4906, the process performs in response to determining that the operator is not looking towards the second vehicle, directing the operator to look towards the second vehicle. When it is determined that the operator is not looking at the second vehicle, the process may warn or otherwise direct the operator to look in that direction, such as by saying or otherwise presenting "Look right!", "Car on your left," or similar message.

FIG. 3.50 is an example flow diagram of example logic illustrating an example embodiment of process 3.100 of FIG. 3.1. More particularly, FIG. 3.50 illustrates a process 3.5000 that includes the process 3.100, wherein the modifying operation of the first vehicle includes operations performed by or at one or more of the following block(s).

At block 3.5002, the process performs presenting a message based on the threat information to an operator of the first vehicle. The process may present (e.g., display an image, play audio) a message, such as a warning or instruction that is based on the threat information. For example, if the threat information identifies icy surface conditions, the message may instruct or recommend that the operator slow down.

FIG. 3.51 is an example flow diagram of example logic illustrating an example embodiment of process 3.5000 of FIG. 3.50. More particularly, FIG. 3.51 illustrates a process 3.5100 that includes the process 3.5000, wherein the presenting a message based on the threat information to an operator of the first vehicle includes operations performed by or at one or more of the following block(s).

At block 3.5102, the process performs presenting a warning to the operator.

FIG. 3.52 is an example flow diagram of example logic illustrating an example embodiment of process 3.5000 of FIG. 3.50. More particularly, FIG. 3.52 illustrates a process 3.5200 that includes the process 3.5000, wherein the presenting a message based on the threat information to an operator of the first vehicle includes operations performed by or at one or more of the following block(s).

At block 3.5202, the process performs presenting an instruction to the operator.

FIG. 3.53 is an example flow diagram of example logic illustrating an example embodiment of process 3.5000 of FIG. 3.50. More particularly, FIG. 3.53 illustrates a process 3.5300 that includes the process 3.5000, wherein the presenting a message based on the threat information to an operator of the first vehicle includes operations performed by or at one or more of the following block(s).

At block 3.5302, the process performs directing the operator to accelerate or decelerate.

FIG. 3.54 is an example flow diagram of example logic illustrating an example embodiment of process 3.5000 of FIG. 3.50. More particularly, FIG. 3.54 illustrates a process 3.5400 that includes the process 3.5000, wherein the presenting a message based on the threat information to an operator of the first vehicle includes operations performed by or at one or more of the following block(s).

At block 3.5402, the process performs directing the operator to turn or not to turn. In some embodiments, the process may provide "turn assistance," by helping drivers better understand when it is appropriate to make a turn across one or more lanes of oncoming traffic. In such an embodiment, the process tracks vehicles as they approach an intersection to determine whether a vehicle waiting to turn across oncoming lanes of traffic has sufficient time, distance, or clearance to cross the lanes without colliding with the approaching vehicles.

FIG. 3.55 is an example flow diagram of example logic illustrating an example embodiment of process 3.5000 of FIG. 3.50. More particularly, FIG. 3.55 illustrates a process 3.5500 that includes the process 3.5000, wherein the presenting a message based on the threat information to an operator of the first vehicle includes operations performed by or at one or more of the following block(s).

At block 3.5502, the process performs presenting the message via an audio output device. The process may play an alarm, bell, chime, voice message, or the like that warns or otherwise informs the user of the threat information. The wearable device may include audio speakers operable to output audio signals, including as part of a set of earphones, earbuds, a headset, a helmet, or the like.

FIG. 3.56 is an example flow diagram of example logic illustrating an example embodiment of process 3.5500 of FIG. 3.55. More particularly, FIG. 3.56 illustrates a process 3.5600 that includes the process 3.5500, wherein the audio output device is a speaker of a wearable device of the operator.

FIG. 3.57 is an example flow diagram of example logic illustrating an example embodiment of process 3.5500 of FIG. 3.55. More particularly, FIG. 3.57 illustrates a process 3.5700 that includes the process 3.5500, wherein the audio output device is a speaker of an audio system of the first vehicle.

FIG. 3.58 is an example flow diagram of example logic illustrating an example embodiment of process 3.5500 of FIG. 3.55. More particularly, FIG. 3.58 illustrates a process 3.5800 that includes the process 3.5500, wherein the audio output device is a speaker of a mobile computing device present within the first vehicle. For example, there may be a tablet computer or smart phone resting on the seat or other location within the first vehicle.

FIG. 3.59 is an example flow diagram of example logic illustrating an example embodiment of process 3.5000 of FIG. 3.50. More particularly, FIG. 3.59 illustrates a process 3.5900 that includes the process 3.5000, wherein the presenting a message based on the threat information to an operator of the first vehicle includes operations performed by or at one or more of the following block(s).

At block 3.5902, the process performs presenting the message via a visual display device. In some embodiments, the wearable device includes a display screen or other mechanism for presenting visual information. For example, when the wearable device is a helmet, a face shield of the helmet may be used as a type of heads-up display for presenting the threat information.

FIG. 3.60 is an example flow diagram of example logic illustrating an example embodiment of process 3.5900 of FIG. 3.59. More particularly, FIG. 3.60 illustrates a process 3.6000 that includes the process 3.5900, wherein the visual display device is a display of a wearable device of the operator.

FIG. 3.61 is an example flow diagram of example logic illustrating an example embodiment of process 3.5900 of FIG. 3.59. More particularly, FIG. 3.61 illustrates a process 3.6100 that includes the process 3.5900, wherein the visual display device is a display of the first vehicle. The vehicle may include a heads-up display, a dashboard display, warning lights, or the like.

FIG. 3.62 is an example flow diagram of example logic illustrating an example embodiment of process 3.5900 of FIG. 3.59. More particularly, FIG. 3.62 illustrates a process 3.6200 that includes the process 3.5900, wherein the presenting a message based on the threat information to an operator of the first vehicle includes operations performed by or at one or more of the following block(s).

At block 3.6202, the process performs displaying an indicator that instructs the operator to look towards an oncoming vehicle identified by the threat information. The displayed indicator may be textual (e.g., "Look right!"), iconic (e.g., an arrow), or the like.

FIG. 3.63 is an example flow diagram of example logic illustrating an example embodiment of process 3.5900 of FIG. 3.59. More particularly, FIG. 3.63 illustrates a process 3.6300 that includes the process 3.5900, wherein the presenting a message based on the threat information to an operator of the first vehicle includes operations performed by or at one or more of the following block(s).

At block 3.6302, the process performs displaying an indicator that instructs the operator to accelerate, decelerate, and/or turn. An example indicator may be or include the text "Speed up," "slow down," "turn left," or similar language.

FIG. 3.64 is an example flow diagram of example logic illustrating an example embodiment of process 3.5000 of FIG. 3.50. More particularly, FIG. 3.64 illustrates a process 3.6400 that includes the process 3.5000, wherein the presenting a message based on the threat information to an operator of the first vehicle includes operations performed by or at one or more of the following block(s).

At block 3.6402, the process performs providing tactile feedback to the user. Tactile feedback may include temperature or positional changes of an object (e.g., steering wheel, seat, pedal) within the first vehicle.

FIG. 3.65 is an example flow diagram of example logic illustrating an example embodiment of process 3.6400 of FIG. 3.64. More particularly, FIG. 3.65 illustrates a process

3.6500 that includes the process 3.6400, wherein the providing tactile feedback to the user includes operations performed by or at one or more of the following block(s).

At block 3.6502, the process performs causing a steering device, seat, and/or pedal of the first vehicle to vibrate.

FIG. 3.66 is an example flow diagram of example logic illustrating an example embodiment of process 3.100 of FIG. 3.1. More particularly, FIG. 3.66 illustrates a process 3.6600 that includes the process 3.100, wherein the modifying operation of the first vehicle includes operations performed by or at one or more of the following block(s).

At block 3.6602, the process performs controlling the first vehicle. In some embodiments, the process may directly modify the operation of the first vehicle by controlling it in some manner, such as by changing the steering, braking, accelerating, or the like.

FIG. 3.67 is an example flow diagram of example logic illustrating an example embodiment of process 3.6600 of FIG. 3.66. More particularly, FIG. 3.67 illustrates a process 3.6700 that includes the process 3.6600, wherein the controlling the first vehicle includes operations performed by or at one or more of the following block(s).

At block 3.6702, the process performs decreasing speed of the first vehicle by applying brakes of the first vehicle and/or by reducing output of an engine of the first vehicle. The process may slow the vehicle by one or more of braking or reducing engine output.

FIG. 3.68 is an example flow diagram of example logic illustrating an example embodiment of process 3.6600 of FIG. 3.66. More particularly, FIG. 3.68 illustrates a process 3.6800 that includes the process 3.6600, wherein the controlling the first vehicle includes operations performed by or at one or more of the following block(s).

At block 3.6802, the process performs increasing speed of the first vehicle by releasing brakes of the first vehicle and/or by increasing output of an engine of the first vehicle. The process may speed up the vehicle by one or more of releasing the brakes or increasing engine output.

FIG. 3.69 is an example flow diagram of example logic illustrating an example embodiment of process 3.6600 of FIG. 3.66. More particularly, FIG. 3.69 illustrates a process 3.6900 that includes the process 3.6600, wherein the controlling the first vehicle includes operations performed by or at one or more of the following block(s).

At block 3.6902, the process performs changing direction of the first vehicle. The process may change direction of the vehicle by modifying the angle of the wheels of the vehicle.

FIG. 3.70 is an example flow diagram of example logic illustrating an example embodiment of process 3.100 of FIG. 3.1. More particularly, FIG. 3.70 illustrates a process 3.7000 that includes the process 3.100, wherein the receiving threat information includes operations performed by or at one or more of the following block(s).

At block 3.7002, the process performs receiving threat information determined based on image data. The process may receive threat information that is based on image data. Image data may be used for performing image processing to identify vehicles or other hazards, to determine whether collisions may occur, determine motion-related information about the first vehicle (and possibly other entities), and the like. The image data may be obtained from various sources, including from a camera attached to a wearable device, a vehicle, a road-side structure, or the like.

FIG. 3.71 is an example flow diagram of example logic illustrating an example embodiment of process 3.7000 of FIG. 3.70. More particularly, FIG. 3.71 illustrates a process 3.7100 that includes the process 3.7000, wherein the receiving threat information determined based on image data includes operations performed by or at one or more of the following block(s).

At block 3.7102, the process performs receiving threat information determined based on image data received from a camera that is attached to at least one of: a road-side structure, a wearable device of a pedestrian, or a second vehicle.

FIG. 3.72 is an example flow diagram of example logic illustrating an example embodiment of process 3.7000 of FIG. 3.70. More particularly, FIG. 3.72 illustrates a process 3.7200 that includes the process 3.7000, wherein the receiving threat information determined based on image data includes operations performed by or at one or more of the following block(s).

At block 3.7202, the process performs receiving threat information determined based on image data that includes multiple images of a second vehicle taken at different times. In some embodiments, the image data comprises video data in compressed or raw form. The video data typically includes (or can be reconstructed or decompressed to derive) multiple sequential images taken at distinct times. Various time intervals between images may be utilized. For example, it may not be necessary to receive video data having a high frame rate (e.g., 30 frames per second or higher), because it may be preferable to determine motion or other properties of the first vehicle based on images that are taken at larger time intervals (e.g., one tenth of a second, one quarter of a second). In some embodiments, transmission bandwidth may be saved by transmitting and receiving reduced frame rate image streams.

FIG. 3.73 is an example flow diagram of example logic illustrating an example embodiment of process 3.7000 of FIG. 3.70. More particularly, FIG. 3.73 illustrates a process 3.7300 that includes the process 3.7000, wherein the receiving threat information determined based on image data includes operations performed by or at one or more of the following block(s).

At block 3.7302, the process performs receiving threat information that includes motion-related information about a second vehicle based on one or more images of the second vehicle, the motion-related information including at least one of a position, velocity, acceleration, and/or mass of the second vehicle. Motion-related information may include information about the mechanics (e.g., kinematics, dynamics) of the second vehicle, including position, velocity, direction of travel, acceleration, mass, or the like. Motion-related information may be determined for vehicles that are at rest. Motion-related information may be determined and expressed with respect to various frames of reference, including the frame of reference of the first/second vehicle, a fixed frame of reference, a global frame of reference, or the like. For example, the position of the second vehicle may be expressed absolutely, such as via a GPS coordinate or similar representation, or relatively, such as with respect to the position of the user (e.g., 20 meters away from the first user). In addition, the position of the second vehicle may be represented as a point or collection of points (e.g., a region, arc, or line). As another example, the velocity of the second vehicle may be expressed in absolute or relative terms (e.g., with respect to the velocity of the first vehicle). The velocity may be expressed or represented as a magnitude (e.g., 10 meters per second), a vector (e.g., having a magnitude and a direction), or the like. In other embodiments, velocity may be expressed with respect to the first vehicle's frame of reference. In such cases, a stationary (e.g., parked) vehicle will appear to be approaching the user if the first vehicle is driving towards the second vehicle. In some embodiments, acceleration of the second vehicle may be determined, for example by determining a rate of change of the velocity of the second vehicle observed over time. Mass of the second vehicle may be determined in various ways, including by identifying the type of the second vehicle (e.g., car, truck, motorcycle), determining the size of the second vehicle based on its appearance in an image, or the like. In some embodiments, the images may include timestamps or other indicators that can be used to determine a time interval between the images. In other cases, the time interval may be known a priori or expressed in other ways, such as in terms of a frame rate associated with an image or video stream.

FIG. 3.74 is an example flow diagram of example logic illustrating an example embodiment of process 3.7000 of FIG. 3.70. More particularly, FIG. 3.74 illustrates a process 3.7400 that includes the process 3.7000, wherein the receiving threat information determined based on image data includes operations performed by or at one or more of the following block(s).

At block 3.7402, the process performs receiving threat information that identifies objects other than vehicles in the image data. Image processing techniques may be employed to identify other objects of interest, including road hazards (e.g., utility poles, ditches, drop-offs), pedestrians, other vehicles, or the like.

FIG. 3.75 is an example flow diagram of example logic illustrating an example embodiment of process 3.7000 of FIG. 3.70. More particularly, FIG. 3.75 illustrates a process 3.7500 that includes the process 3.7000, wherein the receiving threat information determined based on image data includes operations performed by or at one or more of the following block(s).

At block 3.7502, the process performs receiving threat information that includes driving conditions information based on the image data. Image processing techniques may be employed to determine driving conditions, such as surface conditions (e.g., icy, wet), lighting conditions (e.g., glare, darkness), or the like.

FIG. 3.76 is an example flow diagram of example logic illustrating an example embodiment of process 3.100 of FIG. 3.1. More particularly, FIG. 3.76 illustrates a process 3.7600 that includes the process 3.100, wherein the receiving threat information includes operations performed by or at one or more of the following block(s).

At block 3.7602, the process performs receiving threat information determined based on audio data representing an audio signal emitted or reflected by an object. The data representing the audio signal may be raw audio samples, compressed audio data, frequency coefficients, or the like. The data representing the audio signal may represent the sound made by the object, such as from a vehicle engine, a horn, tires, or any other source of sound. The data may also or instead represent audio reflected by an object, such as a sonar ping. The object may be a vehicle, a pedestrian, an animal, a fixed structure, or the like.

FIG. 3.77 is an example flow diagram of example logic illustrating an example embodiment of process 3.7600 of FIG. 3.76. More particularly, FIG. 3.77 illustrates a process 3.7700 that includes the process 3.7600, wherein the receiving threat information determined based on audio data includes operations performed by or at one or more of the following block(s).

At block 3.7702, the process performs receiving threat information determined based on audio data obtained at a microphone array that includes multiple microphones. In some embodiments, a microphone array having two or more microphones is employed to receive audio signals. Differences between the received audio signals may be utilized to perform acoustic source localization or other functions, as discussed further herein.

FIG. 3.78 is an example flow diagram of example logic illustrating an example embodiment of process 3.7700 of FIG. 3.77. More particularly, FIG. 3.78 illustrates a process 3.7800 that includes the process 3.7700, wherein the receiving threat information determined based on audio data obtained at a microphone array includes operations performed by or at one or more of the following block(s).

At block 3.7802, the process performs receiving threat information determined based on audio data obtained at a microphone array, the microphone array coupled to a roadside structure. The array may be fixed to a utility pole, a traffic signal, or the like. In other cases, the microphone array may be situated elsewhere, including on the first vehicle, some other vehicle, a wearable device of a person, or the like.

FIG. 3.79 is an example flow diagram of example logic illustrating an example embodiment of process 3.7600 of FIG. 3.76. More particularly, FIG. 3.79 illustrates a process 3.7900 that includes the process 3.7600, wherein the receiving threat information determined based on audio data includes operations performed by or at one or more of the following block(s).

At block 3.7902, the process performs receiving threat information determined based on acoustic source localization performed to determine a position of the object based on multiple audio signals received via multiple microphones. The position of the object may be determined by analyzing audio signals received via multiple distinct microphones. For example, engine noise of the second vehicle may have different characteristics (e.g., in volume, in time of arrival, in frequency) as received by different microphones. Differences between the audio signals measured at different microphones may be exploited to determine one or more positions (e.g., points, arcs, lines, regions) at which the object may be located. In one approach, at least two microphones are employed. By measuring differences in the arrival time of an audio signal at the two microphones, the position of the object may be determined. The determined position may be a point, a line, an area, or the like. In some embodiments, given information about the distance between the two microphones and the speed of sound, respective distances between each of the two microphones and the object may be determined. Given these two distances (along with the distance between the microphones), the process can solve for the one or more positions at which the second vehicle may be located. In some embodiments, the microphones may be directional, in that they may be used to determine the direction from which the sound is coming. Given such information, triangulation techniques may be employed to determine the position of the object.

FIG. 3.80 is an example flow diagram of example logic illustrating an example embodiment of process 3.100 of FIG. 3.1. More particularly, FIG. 3.80 illustrates a process 3.8000 that includes the process 3.100, and which further includes operations performed by or at the following blocks(s).

At block 3.8002, the process performs identifying multiple threats to the first vehicle, at least one of which is based on the threat information. The process may in some cases identify multiple potential threats, such as one car approaching the first vehicle from behind and another car approaching the first vehicle from the left.

At block 3.8004, the process performs identifying a first one of the multiple threats that is more significant than at least one other of the multiple threats. The process may rank, order, or otherwise evaluate the relative significance or risk presented by each of the identified threats. For example, the process may determine that a truck approaching from the right is a bigger risk than a bicycle approaching from behind. On the other hand, if the truck is moving very slowly (thus leaving more time for the truck and/or the first vehicle to avoid it) compared to the bicycle, the process may instead determine that the bicycle is the bigger risk.

At block 3.8007, the process performs instructing an operator of the first vehicle to avoid the first one of the multiple threats. Instructing the operator may include outputting a command or suggestion to take (or not take) a particular course of action.

FIG. 3.81 is an example flow diagram of example logic illustrating an example embodiment of process 3.8000 of FIG. 3.80. More particularly, FIG. 3.81 illustrates a process 3.8100 that includes the process 3.8000, wherein the identifying a first one of the multiple threats that is more significant than at least one other of the multiple threats includes operations performed by or at one or more of the following block(s).

At block 3.8102, the process performs selecting the most significant threat from the multiple threats.

FIG. 3.82 is an example flow diagram of example logic illustrating an example embodiment of process 3.8000 of FIG. 3.80. More particularly, FIG. 3.82 illustrates a process 3.8200 that includes the process 3.8000, and which further includes operations performed by or at the following blocks(s).

At block 3.8202, the process performs modeling multiple potential accidents that each correspond to one of the multiple threats to determine a collision force associated with each accident. In some embodiments, the process models the physics of various objects to determine potential collisions and possibly their severity and/or likelihood. For example, the process may determine an expected force of a collision based on factors such as object mass, velocity, acceleration, deceleration, or the like.

At block 3.8204, the process performs selecting the first threat based at least in part on which of the multiple accidents has the highest collision force. In some embodiments, the process considers the threat having the highest associated collision force when determining most significant threat, because that threat will likely result in the greatest injury to the first vehicle and/or its occupants.

FIG. 3.83 is an example flow diagram of example logic illustrating an example embodiment of process 3.8000 of FIG. 3.80. More particularly, FIG. 3.83 illustrates a process 3.8300 that includes the process 3.8000, and which further includes operations performed by or at the following blocks(s).

At block 3.8302, the process performs determining a likelihood of an accident associated with each of the multiple threats. In some embodiments, the process associates a likelihood (probability) with each of the multiple threats. Such a probability may be determined with respect to a physical model that represents uncertainty with respect to the mechanics of the various objects that it models.

At block 3.8304, the process performs selecting the first threat based at least in part on which of the multiple threats has the highest associated likelihood. The process may consider the threat having the highest associated likelihood when determining the most significant threat.

FIG. 3.84 is an example flow diagram of example logic illustrating an example embodiment of process 3.8000 of FIG. 3.80. More particularly, FIG. 3.84 illustrates a process 3.8400 that includes the process 3.8000, and which further includes operations performed by or at the following blocks(s).

At block 3.8402, the process performs determining a mass of an object associated with each of the multiple threats. In some embodiments, the process may consider the mass of threat objects, based on the assumption that those objects having higher mass (e.g., a truck) pose greater threats than those having a low mass (e.g., a pedestrian).

At block 3.8404, the process performs selecting the first threat based at least in part on which of the objects has the highest mass, without reference to velocity or acceleration of the object. Mass may thus be used as a proxy for collision force, particularly when it is difficult to determine other information (e.g., velocity) about objects.

FIG. 3.85 is an example flow diagram of example logic illustrating an example embodiment of process 3.100 of FIG. 3.1. More particularly, FIG. 3.85 illustrates a process 3.8500 that includes the process 3.100, and which further includes operations performed by or at the following blocks(s).

At block 3.8502, the process performs determining that an evasive action with respect to the threat information poses a threat to some other object. The process may consider whether potential evasive actions pose threats to other objects. For example, the process may analyze whether directing the operator of the first vehicle to turn right (to avoid a collision with a second vehicle) would cause the first vehicle to instead collide with a pedestrian or some fixed object, which may actually result in a worse outcome (e.g., for the operator and/or the pedestrian) than colliding with the second vehicle.

At block 3.8504, the process performs instructing an operator of the first vehicle to take some other evasive action that poses a lesser threat to the some other object. The process may rank or otherwise order evasive actions (e.g., slow down, turn left, turn right) based at least in part on the risks or threats those evasive actions pose to other entities.

FIG. 3.86 is an example flow diagram of example logic illustrating an example embodiment of process 3.100 of FIG. 3.1. More particularly, FIG. 3.86 illustrates a process 3.8600 that includes the process 3.100, and which further includes operations performed by or at the following blocks(s).

At block 3.8602, the process performs identifying multiple threats that each have an associated likelihood and cost, at least one of which is based on the threat information. In some embodiments, the process may perform a cost-minimization analysis, in which it considers multiple threats, including threats posed to the vehicle operator and to others, and selects a threat that minimizes or reduces expected costs. The process may also consider threats posed by actions taken by the vehicle operator to avoid other threats.

At block 3.8606, the process performs determining a course of action that minimizes an expected cost with respect to the multiple threats. The expected cost of a threat may be expressed as a product of the likelihood of damage associated with the threat and the cost associated with such damage.

FIG. 3.87 is an example flow diagram of example logic illustrating an example embodiment of process 3.8600 of FIG. 3.86. More particularly, FIG. 3.87 illustrates a process 3.8700 that includes the process 3.8600, wherein the cost is based on one or more of a cost of damage to a vehicle, a cost of injury or death of a human, a cost of injury or death of an animal, a cost of damage to a structure, a cost of contents or fixtures within a structure, a cost of emotional distress, and/or cost to a business or person based on negative publicity associated with an accident.

FIG. 3.88 is an example flow diagram of example logic illustrating an example embodiment of process 3.8600 of FIG. 3.86. More particularly, FIG. 3.88 illustrates a process 3.8800 that includes the process 3.8600, wherein the identifying multiple threats includes operations performed by or at one or more of the following block(s).

At block 3.8802, the process performs identifying multiple threats that are each related to different persons or things. In some embodiments, the process considers risks related to multiple distinct entities, possibly including the operator of the first vehicle.

FIG. 3.89 is an example flow diagram of example logic illustrating an example embodiment of process 3.8600 of FIG. 3.86. More particularly, FIG. 3.89 illustrates a process 3.8900 that includes the process 3.8600, wherein the identifying multiple threats includes operations performed by or at one or more of the following block(s).

At block 3.8902, the process performs identifying multiple threats that are each related to the first vehicle and/or an operator thereof. In some embodiments, the process also or only considers risks that are related to the operator of the first vehicle and/or the first vehicle itself.

FIG. 3.90 is an example flow diagram of example logic illustrating an example embodiment of process 3.8600 of FIG. 3.86. More particularly, FIG. 3.90 illustrates a process 3.9000 that includes the process 3.8600, wherein the determining a course of action that minimizes an expected cost includes operations performed by or at one or more of the following block(s).

At block 3.9002, the process performs minimizing expected costs to the operator of the first vehicle posed by the multiple threats. In some embodiments, the process attempts to minimize those costs borne by the operator of the first vehicle. Note that this may in some cases cause the process to recommend a course of action that is not optimal from a societal or aggregate perspective, such as by directing the operator to take an evasive action that may cause or contribute to an accident involving other vehicles. Such an action may spare the first vehicle and its operator, but cause a greater injury to other parties.

FIG. 3.91 is an example flow diagram of example logic illustrating an example embodiment of process 3.8600 of FIG. 3.86. More particularly, FIG. 3.91 illustrates a process 3.9100 that includes the process 3.8600, wherein the determining a course of action that minimizes an expected cost includes operations performed by or at one or more of the following block(s).

At block 3.9102, the process performs minimizing overall expected costs posed by the multiple threats, the overall expected costs being a sum of expected costs borne by an operator of the first vehicle and other persons/things. In some embodiments, the process attempts to minimize social costs, that is, the costs borne by the various parties to an accident. Note that this may cause the process to recommend a course of action that may have a high cost to the user (e.g., crashing into a wall and damaging the user's car) to spare an even higher cost to another person (e.g., killing a pedestrian).

FIG. 3.92 is an example flow diagram of example logic illustrating an example embodiment of process 3.100 of FIG. 3.1. More particularly, FIG. 3.92 illustrates a process 3.9200 that includes the process 3.100, and which further includes operations performed by or at the following blocks(s).

At block 3.9202, the process performs performing the receiving threat information, the determining that the threat information is relevant to safe operation of the first vehicle, and/or the modifying operation of the first vehicle at a computing system of the first vehicle.

FIG. 3.93 is an example flow diagram of example logic illustrating an example embodiment of process 3.100 of FIG. 3.1. More particularly, FIG. 3.93 illustrates a process 3.9300 that includes the process 3.100, and which further includes operations performed by or at the following blocks(s).

At block 3.9302, the process performs performing the determining that the threat information is relevant to safe operation of the first vehicle and/or the modifying operation of the first vehicle at a computing system remote from the first vehicle.

3. Example Computing System Implementation

Figure 4:
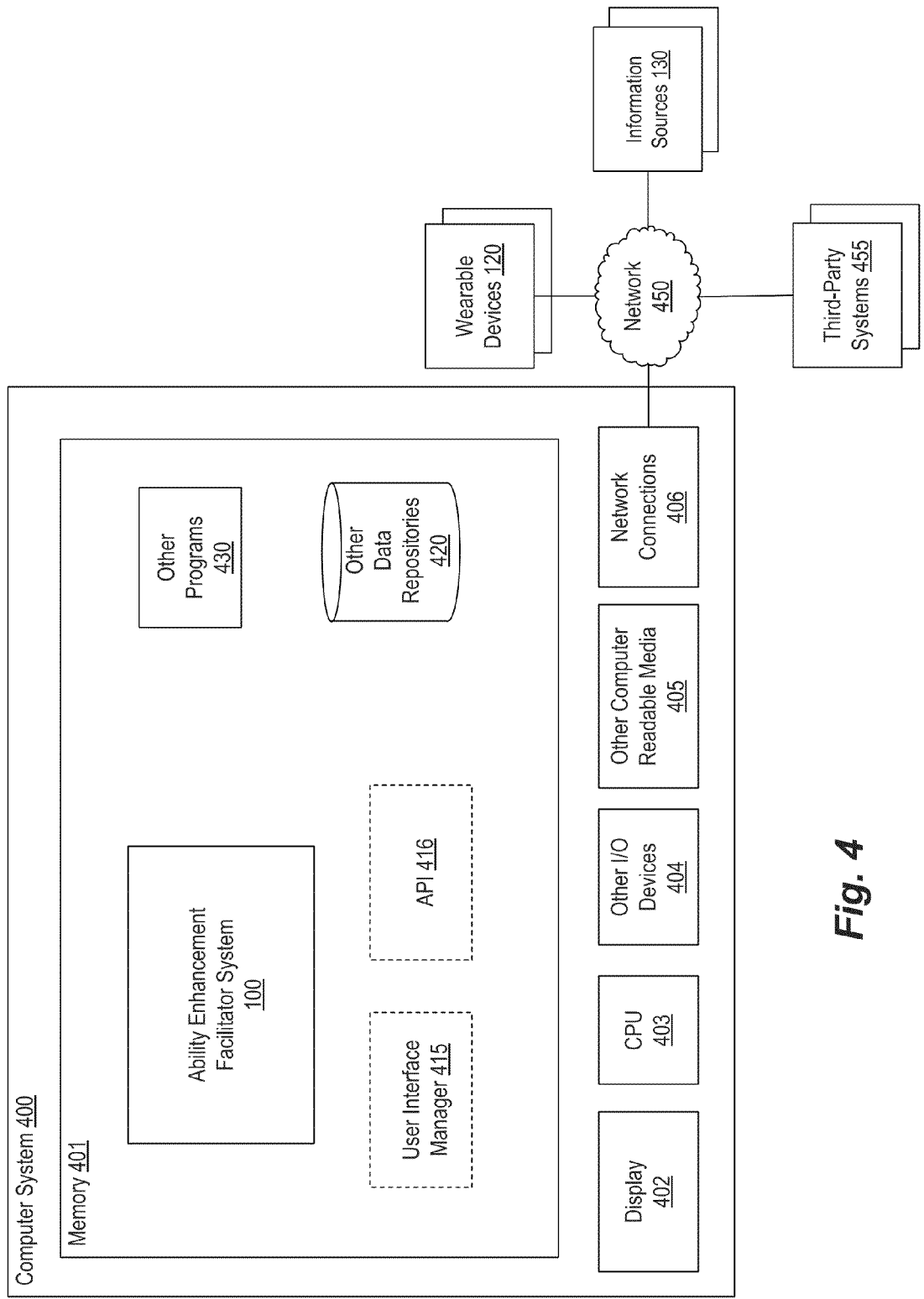
FIG. 4 is an example block diagram of an example computing system for implementing an ability enhancement facilitator system according to an example embodiment.

FIG. 4 is an example block diagram of an example computing system for implementing an ability enhancement facilitator system according to an example embodiment. In particular, FIG. 4 shows a computing system 400 that may be utilized to implement an AEFS 100.

Note that one or more general purpose or special purpose computing systems/devices may be used to implement the AEFS 100. In addition, the computing system 400 may comprise one or more distinct computing systems/devices and may span distributed locations. Furthermore, each block shown may represent one or more such blocks as appropriate to a specific embodiment or may be combined with other blocks. Also, the AEFS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The AEFS 100 is shown residing in memory 401. In other embodiments, some portion of the contents, some or all of the components of the AEFS 100 may be stored on and/or transmitted over the other computer-readable media 405. The components of the AEFS 100 preferably execute on one or more CPUs 403 and implement techniques described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The AEFS 100 interacts via the network 450 with wearable devices 120, information sources 130, and third-party systems/applications 455. The AEFS 100 may also generally interact with other output devices, such as the presentation device 250 described with respect to FIG. 2. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the AEFS 100, including Web browsers, vehicle-based client systems, traffic tracking, monitoring, or prediction systems, and the like.

The AEFS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the AEFS 100.

The UI manager 415 provides a view and a controller that facilitate user interaction with the AEFS 100 and its various components. For example, the UI manager 415 may provide interactive access to the AEFS 100, such that users can configure the operation of the AEFS 100, such as by providing the AEFS 100 with information about common routes traveled, vehicle types used, driving patterns, or the like. The UI manager 415 may also manage and/or implement various output abstractions, such that the AEFS 100 can cause vehicular threat information to be displayed on different media, devices, or systems. In some embodiments, access to the functionality of the UI manager 415 may be provided via a Web server, possibly executing as one of the other programs 430. In such embodiments, a user operating a Web browser executing on one of the third-party systems 455 can interact with the AEFS 100 via the UI manager 415.

The API 416 provides programmatic access to one or more functions of the AEFS 100. For example, the API 416 may provide a programmatic interface to one or more functions of the AEFS 100 that may be invoked by one of the other programs 430 or some other module. In this manner, the API 416 facilitates the development of third-party software, such as user interfaces, plug-ins, adapters (e.g., for integrating functions of the AEFS 100 into vehicle-based client systems or devices), and the like.

In addition, the API 416 may be in at least some embodiments invoked or otherwise accessed via remote entities, such as code executing on one of the wearable devices 120, information sources 130, and/or one of the third-party systems/applications 455, to access various functions of the AEFS 100. For example, an information source 130 such as a radar gun installed at an intersection may push motion-related information (e.g., velocity) about vehicles to the AEFS 100 via the API 416. As another example, a weather information system may push current conditions information (e.g., temperature, precipitation) to the AEFS 100 via the API 416. The API 416 may also be configured to provide management widgets (e.g., code modules) that can be integrated into the third-party applications 455 and that are configured to interact with the AEFS 100 to make at least some of the described functionality available within the context of other applications (e.g., mobile apps).

In an example embodiment, components/modules of the AEFS 100 are implemented using standard programming techniques. For example, the AEFS 100 may be implemented as a "native" executable running on the CPU 403, along with one or more static or dynamic libraries. In other embodiments, the AEFS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 100, such as in the data store 420 (or 240), can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for ability enhancement are applicable to other architectures or in other settings. For example, instead of providing threat information to human users who are vehicle operators or pedestrians, some embodiments may provide such information to control systems that are installed in vehicles and that are configured to automatically take action to avoid collisions in response to such information. In addition, the techniques are not limited just to road-based vehicles (e.g., cars, bicycles), but are also applicable to airborne vehicles, including unmanned aerial vehicles (e.g., drones). Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for enhancing ability in a transportation-related context, the method comprising:
at a first vehicle, receiving threat information from a remote device, the threat information based at least in part on information about objects and/or conditions proximate to the remote device, wherein the receiving threat information includes receiving threat information determined by a wearable device of an occupant of a second vehicle;
determining that the threat information is relevant to safe operation of the first vehicle; and
modifying operation of the first vehicle based on the threat information, including presenting a message based on the threat information to an operator of the first vehicle, wherein the presenting the message includes presenting the message via a wearable device of the operator of the first vehicle.

2. The method of claim 1, wherein the receiving threat information includes: receiving threat information determined based on information about driving conditions proximate to the remote device.

3. The method of claim 2, wherein the information about driving conditions indicates that icy surface conditions are present proximate to the remote device.

4. The method of claim 2, wherein the information about driving conditions indicates that wet surface conditions are present proximate to the remote device, wherein the wet surface conditions are inferred based on reports of precipitation received from a weather system.

5. The method of claim 2, wherein the information about driving conditions indicates that oily surface conditions are present proximate to the remote device.

6. The method of claim 2, wherein the information about driving conditions indicates that a limited visibility condition is present proximate to the remote device, wherein the limited visibility condition is determined based on a light sensor indicating glare from the sun.

7. The method of claim 2, wherein the information about driving conditions indicates that there is an accident proximate to the remote device, wherein presence of the accident is determined based on information received from an accelerometer that is configured to detect accidents based on sudden deceleration.

8. The method of claim 1, wherein the receiving threat information includes: receiving threat information determined based on information about the second vehicle proximate to the remote device, wherein the information about the second vehicle indicates at least one of: that the second vehicle is driving erratically, that the second vehicle is driving with excessive speed; and/or that the second vehicle is driving too slowly.

9. The method of claim 1, wherein the receiving threat information includes: receiving threat information determined based on information about a pedestrian proximate to the remote device.

10. The method of claim 1, wherein the receiving threat information includes: receiving threat information determined at the second vehicle with respect to information about objects and/or conditions received at the second vehicle.

11. The method of claim 10, wherein the receiving threat information determined at the second vehicle includes: receiving threat information determined by a computing device installed in the second vehicle.

12. The method of claim 10, wherein the receiving threat information determined at the second vehicle includes: receiving motion-related information from a velocity and/or position sensor attached to the second vehicle.

13. The method of claim 1, wherein the receiving threat information includes: receiving threat information determined by a road-based device with respect to information about objects and/or conditions received at the road-based device.

14. The method of claim 13, wherein the receiving threat information determined by a road-based device includes: receiving threat information determined by a road-based computing device configured to receive the information about objects and/or conditions from vehicles proximate to the road-based computing device.

15. The method of claim 13, wherein the receiving threat information determined by a road-based device includes: receiving threat information determined by a road-based computing device configured to receive the information about objects and/or conditions from road-based sensors.

16. The method of claim 13, wherein the road-based device is a sensor attached to a structure proximate to the first vehicle.

17. The method of claim 16, wherein the structure proximate to the first vehicle is one of a utility pole, a traffic control signal support, a building, a street light, a tunnel wall, a bridge, an overpass, a flyover, a communication tower, a traffic kiosk, an advertisement structure, a roadside sign, an information/regulatory display, and/or a vehicle toll reader.

18. The method of claim 16, wherein the receiving threat information determined by a road-based device includes: receiving an image of the second vehicle from a camera deployed at an intersection.

19. The method of claim 16, wherein the receiving threat information determined by a road-based device includes: receiving ranging data from a range sensor deployed at an intersection, the ranging data representing a distance between the second vehicle and the intersection.

20. The method of claim 16, wherein the road-based device includes at least one of: a camera, a microphone, a radar gun, and/or a range sensor.

21. The method of claim 16, wherein the road-based device includes a receiver operable to receive motion-related information transmitted from the second vehicle, the motion-related information including at least one of a position of the second vehicle, a velocity of the second vehicle, and/or a trajectory of the second vehicle.

22. The method of claim 13, wherein the road-based device is embedded in a roadway.

23. The method of claim 22, wherein the road-based device includes an induction loop embedded in the roadway, the induction loop configured to detect the presence and/or velocity of the second vehicle.

24. The method of claim 23, wherein the receiving threat information determined by a road-based device includes: receiving motion-related information from the induction loop, the motion-related information including at least one of a position of the second vehicle, a velocity of the second vehicle, and/or a trajectory of the second vehicle.

25. The method of claim 1, wherein the determining that the threat information is relevant to safe operation of the first vehicle includes:
   determining a location associated with the remote device; and
   determining whether the first vehicle is approaching the location.

26. The method of claim 25, wherein the location associated with the remote device includes the location of a road-based device.

27. The method of claim 25, wherein the location associated with the remote device includes a location of the second vehicle that includes the remote device.

28. The method of claim 25, wherein the determining whether the first vehicle is approaching the location includes: determining whether the first vehicle is within a threshold distance from the location associated with the remote device.

29. The method of claim 25, wherein the determining whether the first vehicle is approaching the location includes: determining whether the first vehicle is moving on trajectory that intersects the location associated with the remote device.

30. The method of claim 1, wherein the determining that the threat information is relevant to safe operation of the first vehicle includes:
   determining a threat to the first vehicle based on the threat information;
   determining a likelihood associated with the threat; and
   determining that the likelihood is greater than a threshold level.

31. The method of claim 30, wherein the determining a threat to the first vehicle based on the threat information includes:
   predicting a path of an object identified by the threat information;
   predicting a path of the first vehicle; and
   determining, based on the paths of the object and the first vehicle, whether the first vehicle and the object will come within a threshold distance of one another.

32. The method of claim 30, wherein the determining a likelihood associated with the threat includes: determining a likelihood that the first vehicle will collide with the second vehicle identified by the threat information.

33. The method of claim 30, wherein the determining a likelihood associated with the threat includes: determining a likelihood that the first vehicle will collide with an animal identified by the threat information.

34. The method of claim 30, wherein the determining a likelihood associated with the threat includes: determining a likelihood that surface conditions identified by the threat information will cause the operator to lose control of the first vehicle.

35. The method of claim 1, wherein the determining that the threat information is relevant to safe operation of the first vehicle includes: determining that the threat information is relevant based on gaze information associated with the operator of the first vehicle.

36. The method of claim 35, further comprising: determining that the operator has not looked at the road for more than a threshold amount of time.

37. The method of claim 1, wherein the presenting a message based on the threat information to the operator of the first vehicle includes at least one of: presenting a warning to the operator; presenting an instruction to the operator; directing the operator to accelerate or decelerate; directing the operator to turn or not to turn.

38. The method of claim 1, wherein the presenting a message based on the threat information to the operator of the first vehicle includes: presenting the message via an audio output device that is a speaker of a wearable device of the operator.

39. The method of claim 1, wherein the presenting a message based on the threat information to the operator of the first vehicle includes: presenting the message via a visual display device of a wearable device of the operator, the message instructing the operator to accelerate, decelerate, turn, and/or look towards an oncoming vehicle identified by the threat information.

40. The method of claim 1, wherein the presenting a message based on the threat information to the operator of the first vehicle includes: providing tactile feedback to the operator of the first vehicle.

41. The method of claim 40, wherein the providing tactile feedback to the operator of the first vehicle includes: causing a steering device, seat, and/or pedal of the first vehicle to vibrate.

42. The method of claim 1, wherein the modifying operation of the first vehicle includes: controlling the first vehicle by performing at least one of: decreasing speed of the first vehicle by applying brakes of the first vehicle and/or by reducing output of an engine of the first vehicle; increasing speed of the first vehicle by releasing brakes of the first vehicle and/or by increasing output of an engine of the first vehicle; and/or changing direction of the first vehicle.

43. The method of claim 1, wherein the receiving threat information includes: receiving threat information determined based on image data received from a camera that is attached to at least one of: a road-side structure, a wearable device of a pedestrian, or the second vehicle, the image data including multiple images of the second vehicle taken at different times.

44. The method of claim 1, wherein the receiving the threat information includes: receiving threat information determined based on acoustic source localization performed to determine a position of one of the objects based on multiple audio signals received via multiple microphones.

45. The method of claim 1, further comprising:
   identifying multiple threats to the first vehicle, at least one of which is based on the threat information;
   identifying a first one of the multiple threats that is more significant than at least one other of the multiple threats; and
   instructing the operator of the first vehicle to avoid the first one of the multiple threats.

46. A non-transitory computer-readable medium including contents that are configured, when executed, to cause a computing system to perform a method for enhancing ability in a transportation-related context, the method comprising:
   at a first vehicle, receiving threat information from a remote device, the threat information based at least in part on information about objects and/or conditions proximate to the remote device, wherein the receiving threat information includes receiving threat information determined by a wearable device of an occupant of a second vehicle;
   determining that the threat information is relevant to safe operation of the first vehicle; and
   modifying operation of the first vehicle based on the threat information, including presenting a message based on the threat information to an operator of the first vehicle, wherein the presenting the message includes presenting the message via a wearable device of the operator of the first vehicle.

47. A computing system for enhancing ability in a transportation-related context, the computing system comprising:

a processor;

a memory; and a module that is stored in the memory and that is configured, when executed by the processor, to perform a method comprising:

at a first vehicle, receiving threat information from a remote device, the threat information based at least in part on information about objects and/or conditions proximate to the remote device, wherein the receiving threat information includes receiving threat information determined by a wearable device of an occupant of a second vehicle;

determining that the threat information is relevant to safe operation of the first vehicle; and modifying operation of the first vehicle based on the threat information, including presenting a message based on the threat information to an operator of the first vehicle, wherein the presenting the message includes presenting the message via a wearable device of the operator of the first vehicle.

* * * * *